(12) United States Patent
Katayama et al.

(10) Patent No.: US 6,311,126 B1
(45) Date of Patent: Oct. 30, 2001

(54) MOVING BODY MAP INFORMATION DISPLAY SYSTEM

(75) Inventors: Mutsumi Katayama; Hiroyuki Morita, both of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/717,128

(22) Filed: Nov. 22, 2000

(30) Foreign Application Priority Data

Nov. 26, 1999 (JP) .................................................. 11-336502

(51) Int. Cl.⁷ .................................................. G06F 165/00
(52) U.S. Cl. .......................... 701/208; 701/212; 701/213
(58) Field of Search .................................... 701/208, 207, 701/209, 210, 212, 213, 24; 340/990, 995

(56) References Cited

U.S. PATENT DOCUMENTS

| | | | |
|---|---|---|---|
| 5,961,571 | * 10/1999 | Gorr et al. | 701/212 |
| 6,115,669 | * 9/2000 | Watanabe et al. | 701/208 |
| 6,154,152 | * 11/2000 | Ito et al. | 701/208 |
| 6,159,516 | * 1/2001 | Watanabe et al. | 701/708 |

FOREIGN PATENT DOCUMENTS

| 66877 | * 12/1982 | (EP) | 701/212 |
|---|---|---|---|
| 7-83684 | 3/1995 | (JP) . | |

* cited by examiner

*Primary Examiner*—Richard M. Camby

(57) ABSTRACT

The present invention provides a moving body map information display system that is capable of extracting and displaying the desired map information correctly and easily without changing the transition point and the route that have been set by an operator. A limited region map information generation device, that is provided for extracting the map information of only the limited region based on the route point coordinate information of a map that is stored in a memory medium. The device includes the road information to thereby generate the limited region map information, includes a route generation capability for generating a moving body route based on the route point coordinate information, the road information, and various display parameters.

14 Claims, 21 Drawing Sheets

| ROUTE | SECTION DISTANCE | EXTRACTION WIDTH | REQUIRED MEMORY CAPACITY |
|---|---|---|---|
| $r_1$ | $L_1$ | $\Delta W_1$ | $L_1 \times \Delta W_1$ |
| $r_2$ | $L_2$ | $\Delta W_2$ | $L_2 \times \Delta W_2$ |
| ⋮ | ⋮ | ⋮ | ⋮ |
| $r_i$ | $L_i$ | $\Delta W_i$ | $L_i \times \Delta W_i$ |
| ⋮ | ⋮ | ⋮ | ⋮ |
| $r_{n-1}$ | $L_{n-1}$ | $\Delta W_{n-1}$ | $L_{n-1} \times \Delta W_{n-1}$ |

*FIG. 6*

| POINT | SHAPE | RANGE | | REQUIRED MEMORY CAPACITY |
|---|---|---|---|---|
| $P_1$ | $C_1$ | $R_1$ | | $\pi(R_1)^2$ |
| $P_2$ | $C_2$ | $M_2$ | $N_2$ | $M_2 N_2$ |
| ⋮ | ⋮ | ⋮ | | ⋮ |
| $P_i$ | $C_i$ | $S_1$ | $T_1$ | $\pi S_i T_i$ |
| ⋮ | ⋮ | ⋮ | | ⋮ |
| $P_n$ | $C_n$ | $D_n$ | | $(D_n)^2$ |

FIG. 7

| SCALE LEVEL | SCALE | HORIZONTAL DISTANCE | VERTICAL DISTANCE |
|---|---|---|---|
| 1 | 500km | 2600km | 2000km |
| 2 | 200km | 1000km | 800km |
| 3 | 100km | 530km | 400km |
| 4 | 32km | 170km | 128km |
| 5 | 16km | 85km | 64km |
| 6 | 8km | 42km | 32km |
| 7 | 4km | 21km | 16km |
| 8 | 2km | 10km | 8km |
| 9 | 1km | 5.3km | 4km |
| 10 | 500m | 2.6km | 2km |
| 11 | 200m | 1km | 800m |
| 12 | 100m | 530m | 400m |
| 13 | 50m | 260m | 200m |
| 14 | 25m | 130m | 100m |

*FIG. 10*

| SMALL SECTION NUMBER K IN ROUTE $R_i$ | SCALE LEVEL ($LEVEL_i(K)$) |
|---|---|
| 1 | 14 |
| 2 | 13 |
| ⋮ | ⋮ |
| 9 | 5 |
| 10 | 4 |
| 11 | 4 |
| 12 | 5 |
| ⋮ | ⋮ |
| 19 | 13 |
| 20 | 14 |

*FIG. 12*

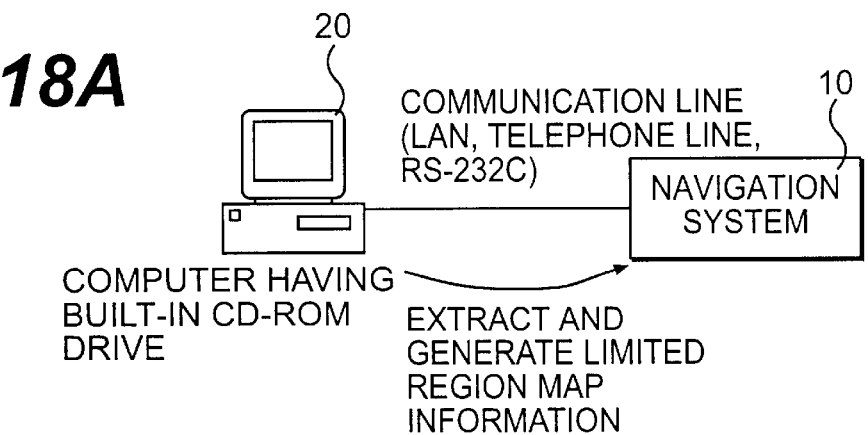
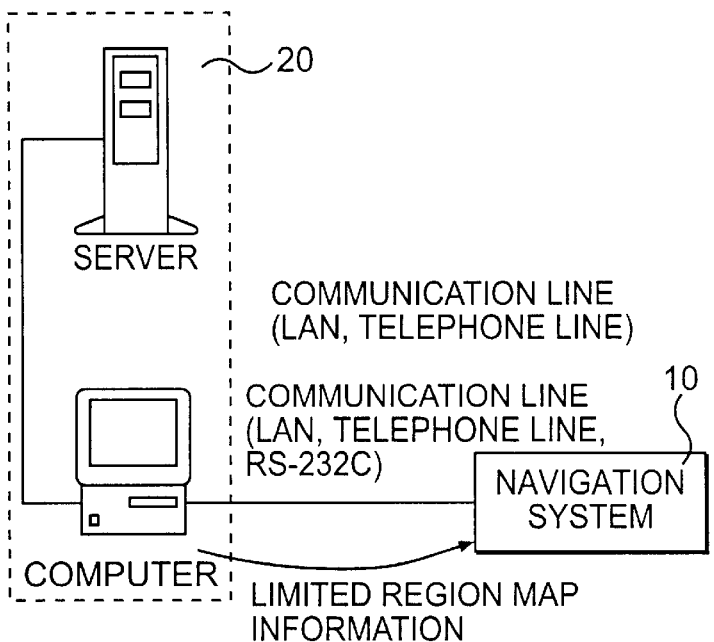
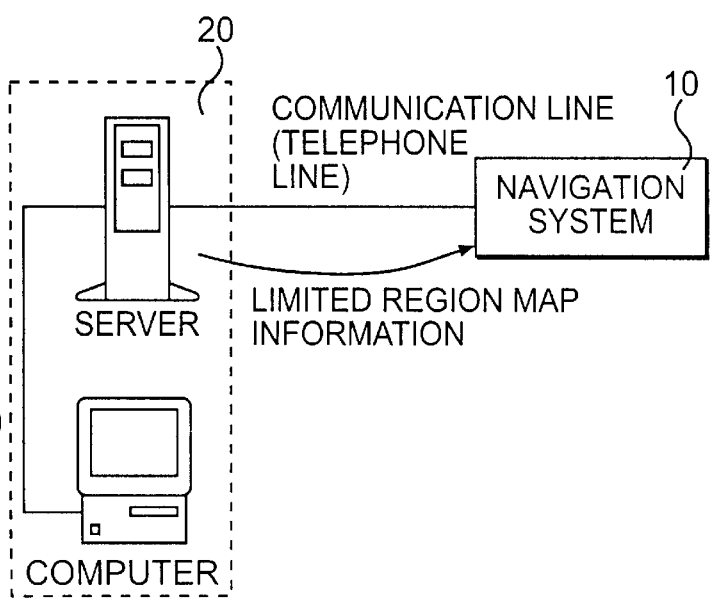

MOVING BODY MAP INFORMATION DISPLAY SYSTEM

BACKGROUND OF THE INVENTION

1. Field of the Invention

The present invention relates to a moving body map information display system for accurately displaying map information extracted from a recording medium.

2. Background Art

A conventional map information display apparatus for displaying the extracted map information of a desired region in a navigation device is disclosed in JP-A No. H7-83684. In this type of apparatus, difficulties arise when an operator controlling the map information display apparatus wants to extract map information having a size larger than the memory capacity of the apparatus. In this case, some of the information from the map of the regions selected by the operator may be deleted in order to operate within the apparatus' memory capacity. Alternatively, a map on a reduced scale is extracted so that the overall size of the map information selected is within the memory capacity of the apparatus. Once the information has been reduced to a manageable size, the map information can then be written into the memory.

However, these approaches require that some of the information relating to the region that has been set by an operator is deleted. This reduction in information through the deletion of the size, extent, or contents of the map selected often obliges a traveler to change the route or transit point. Ultimately, a traveler may then be obliged to change the schedule or the route of travel desired by vehicle or motorbike. Furthermore, when more detailed map information of a portion on the selected region is required, a user is obliged to select and utilize a map on a reduced scale in order to reduce the size of the map information. In either case, the detailed map information of these partial regions cannot be extracted and utilized advantageously and the use of maps through these methods can be troublesome.

SUMMARY OF THE INVENTION

The present invention overcomes the shortcomings associated with the related art and achieves other advantages not realized by the prior art.

An object of the present invention to provide a moving body map information display system that extracts and displays desired map information correctly and easily without changing the route or transit point that has been set by the operator.

These and other objects are accomplished by a moving body map information display system comprising means for generating a set of route point coordinate information for indicating points on a transition route and a scheduled route of a moving body; means for generating and extracting a plurality of limited region map information, said limited region map information based on said route point coordinate information that is stored in a memory medium and includes a plurality of road information to thereby generate the limited region map information; means for storing said limited region map information; and means for displaying said stored limited region map information, wherein said means for generating said limited region map information further includes means for generating a moving body route based on said route point coordinate information and said road information, means for setting a map scale, wherein scale magnitudes of a plurality of strip-like regions of map information located along said moving body route varies along said moving body route, and means for extracting said strip-like regions based on said scale magnitudes.

According to the characteristics of an embodiment of the present invention, since the scale magnitude of the strip-like region map information changes along the moving body route and then the strip-like region map information is extracted, the required map information is extracted correctly and easily without the necessity of changing the transition point and the route that have been set by an operator. Accordingly, the necessary map information is displayed while still maintaining an operator's desired display.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 6 is a strip-like map information table generated in a RAM 16 based on the set content;

FIG. 7 is a searching map information table generated in the RAM 16 based on the set content;

FIG. 10 is a table that lists the scale of the map information, horizontal distance, and vertical distance stored in a memory medium according to an embodiment of the present invention;

FIG. 12 is a table generated by implementing the scale setting subroutine shown in FIG. 9;

FIG. 18 is a schematic diagram for illustrating the third and fourth examples of the present invention;

DETAILED DESCRIPTION OF THE PREFERRED EMBODIMENTS

Hereinafter, the present invention will be described in detail with reference to the accompanying drawings.

Examples of the present invention will be described hereinafter in detail with reference to the drawings.

Figure 1:
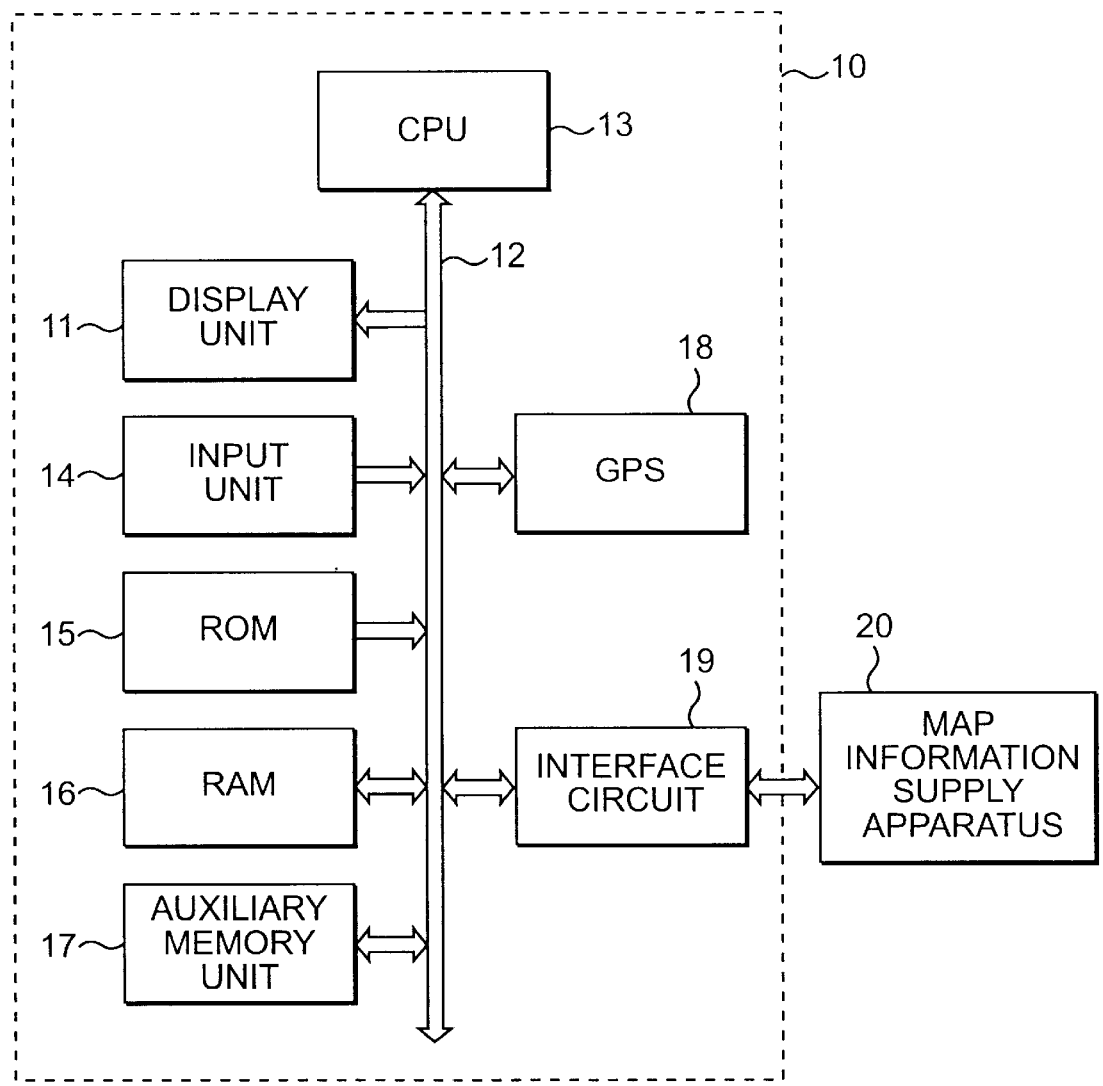
FIG. 1 is a block diagram for illustrating a moving body map information display system according to the present invention.

FIG. 1 shows a moving body map information display system according to the first example of the present invention.

The moving body map information display system shown in FIG. 1 comprises a moving body map information display apparatus 10, such as a vehicle navigation system, and a map information supply apparatus 20 such as a CD-ROM drive or DVD drive.

A display unit 11 provided on the moving body map information display apparatus 10 comprises a display (not shown) such as a CRT, liquid crystal panel or the like, a graphic memory (not shown), and a graphic controller (not shown) connected to an input/output bus 12. The input/output bus 12 allows the data signal or address signal input to/output from a central processing unit (referred to as CPU hereinafter) 13. The display unit 11 displays the map information transmitted through the input/output bus 12. Furthermore, an input unit 14 is connected to the input/output bus 12, and various commands entered by an operator are transmitted from the input unit 14 to the CPU 13. The input unit 14 comprises a key board including selection keys used for selecting the item displayed on the display unit 11, cursor keys (not shown) and/or the like used for specifying the position on the map displayed on the display unit 11.

Furthermore, the input unit 14 may include a pointing device such as a mouse or the like for specifying the position on the map displayed on the display unit 11. Furthermore, the input/output bus 12 is connected to a ROM (read only memory) 15 and a RAM (random access memory) 16. The ROM 15 stores a program for generating the limited region map information as described hereinafter and a program to be executed in response to a command entered from the input unit 14. On the other hand, the RAM 16 stores the limited region map information to be displayed on the display unit 11 and the variable values of the program to be executed. The RAM 16 comprises the memory that is capable of holding the stored content even when the power source is shut down such as non-volatile memory.

Furthermore, as shown in FIG. 1, an auxiliary memory unit 17 may be connected to the input/output bus 12. The auxiliary memory unit 17 comprises an IC card comprising, for example, a non-volatile memory and an interface circuit (not show in the drawing) thereof, and is used for storing the limited region map information requiring memory exceeding the memory capacity of the RAM 16.

Furthermore, the input/output bus 12 is connected to a GPS (global positioning system) unit 18. The GPS unit is used for detecting the absolute position of a moving body based on the longitude and latitude information. The detected positional data is supplied to the input/output bus 12, and a mark that indicates the position of the moving body map information display apparatus based on the positional data is displayed on a map displayed on the display unit 11.

The map information supply apparatus 20 comprises a CD-ROM drive or DVD drive for reading the map information written in a non-volatile recording medium such as a CD-ROM or DVD. The map information stored in the CD-ROM or DVD is read out in response to a command supplied from the CPU 13 and supplied to the input/output bus 12 through the interface circuit 19.

In the first example, a moving body map information display system comprises the moving body map information display apparatus 10 and the map information supply apparatus 20. A coordinate information generation means comprises the input unit 14. A limited region map information generation means, route generation means, and extraction means or scale setting means comprises the input/output bus 12, the CPU 13, and the ROM 15. A display means comprises the display unit 11. A memory means comprises the RAM 16 and the auxiliary memory unit 17. A present position coordinate information detection means comprises GPS unit 18.

In the following description, it is assumed that the moving body map information display system has been activated and operated normally after a properly implemented activation process, such as initialization or the like, of the variables to be used in the CPU 13.

Figure 2:
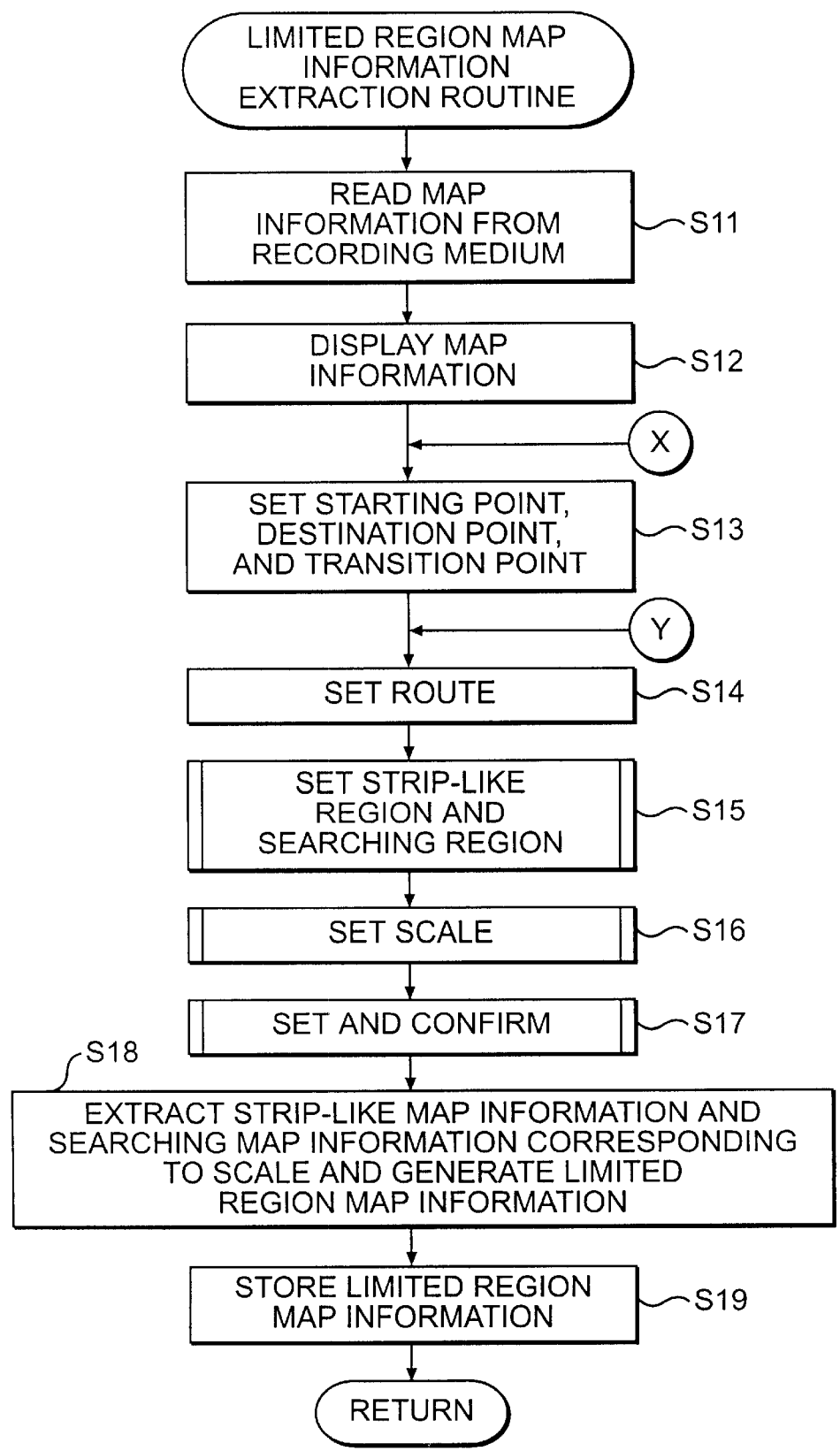
FIG. 2 is a flow chart for describing a subroutine for extracting a limited region map information according to an embodiment of the present invention.

FIG. 2 shows a subroutine for extracting and generating the limited region map information.

At first, the map information stored in the non-volatile memory medium is read from the map information supply unit 20 in response to a key input of the input unit 11 operated by an operator (step S11), and the map information read is displayed on the display unit 11 (step S12).

Next, route points such as a starting point, destination point, and transit points are set from the input unit 11 (step S13). In this route point setting operation, the coordinate information of each point, for example, the coordinate data such as latitude and longitude are set by means of input operation of a key board or a mouse. In the input operation, for example, a pointer such as a cross-shaped pointer or an arrow-shaped pointer is displayed on a map displayed on the display unit 11 for specifying a point on the map, and the pointer is moved by operating cursor keys or the mouse to specify various points. In the case that there are a plurality of probable point names near the specified points, these point names may be displayed on the display unit 11 for selecting one point name by means of a selection key. When one point name is selected, one set of coordinate data corresponding to the point name is obtained. Furthermore, in order to make ease input operation and to make the display more readily visible, a function for enlarging or reducing the map scale to be displayed on the display unit may be provided. This additional function can also be provided by means of another key allocated to this function.

In the following description, the starting point is denoted by $P_1$, the destination point is denoted by $P_n$, and the transit points are denoted by $P_2, \ldots, P_i, \ldots, P_{n-1}$. Furthermore, a section between two adjacent points such as $P_1$ to $P_2$ or $P_i$ to $P_{i-1}$, is referred to as two-point section.

Next, a route on which the moving body will move is searched and set on the map displayed on the display unit 11 based on the coordinate information corresponding to $P_1$ to $P_n$ and the road information included in the map information (step S14). Any well known method, for example that disclosed in JP-A No. H7-55481 or JP-A No. H7-91971, may be applied for the route searching functionality. In the case that there are a plurality of selectable routes for any two-point section, a method may be applied, in which these plurality of routes are displayed on the map, a pointer is displayed on the display unit 11 as described hereinabove, and a route is selected by use of the cursor keys or the mouse. Respective routes that have been set for corresponding two-point sections are denoted by $r_i$ (i=1, 2, . . . n-1) in a preferred embodiment. For example, the route $r_1$ can be designated and set for the two-point section between $P_1$ and $P_2$, $r_i$ set for the two point section between $P_i$ and $P_{i-1}$, and $r_{n-1}$ for the two point section between $P_{n-1}$ and $P_n$.

Figure 3:
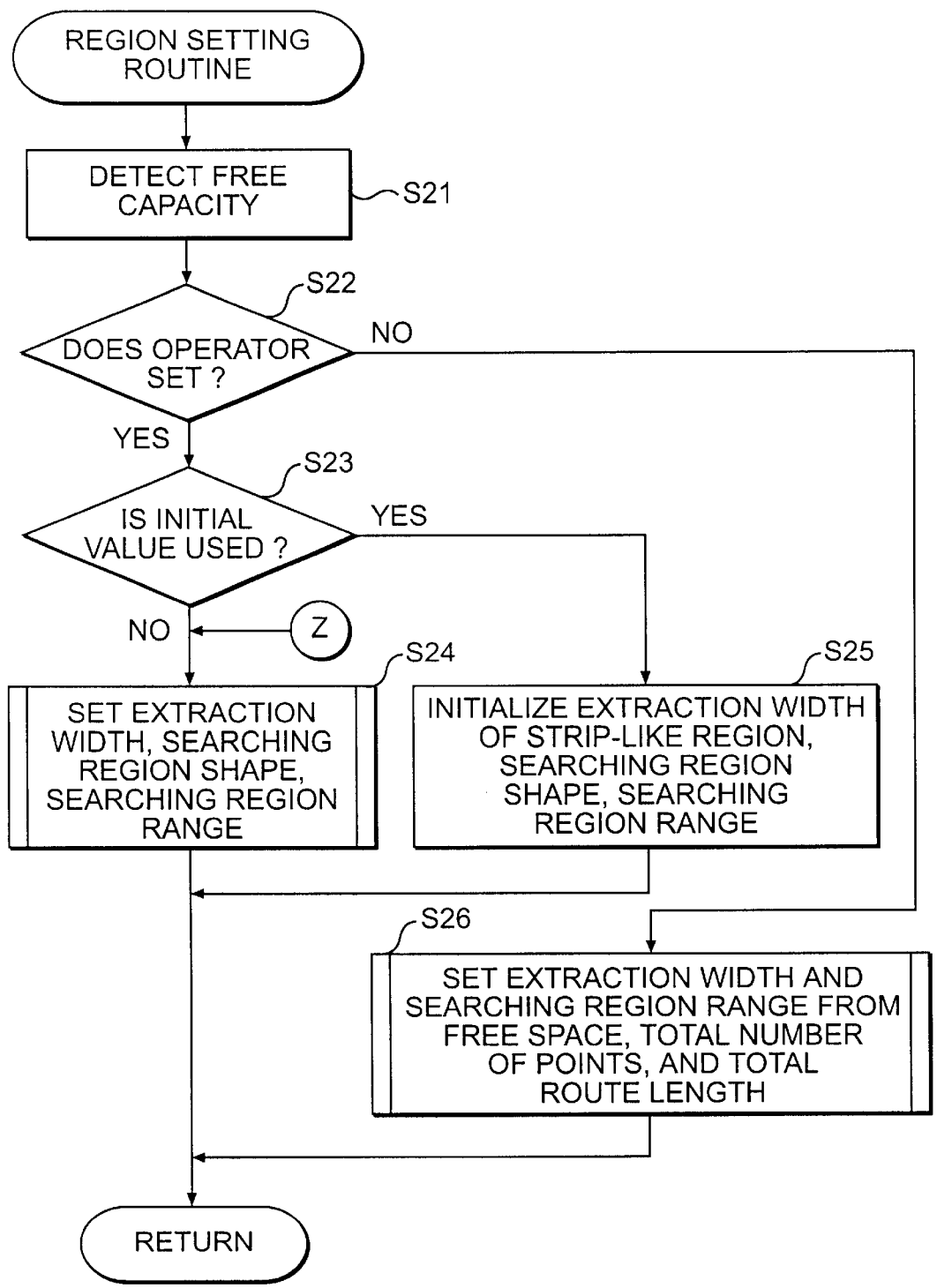
FIG. 3 is a flow chart for describing a subroutine for setting a strip-like region and searching region according to an embodiment of the present invention.

Next, a region setting subroutine shown in FIG. 3 is called/executed, that will be described hereinafter, wherein a strip-like region and a searching region are set (step S15). Next, a scale setting subroutine shown in FIG. 9 that will be described hereinafter is called/executed, and the scale magnitude of the map information of the strip-like region and searching region is set (step S16). The accuracy and confirmation of the items that have been set in steps S15 and Si16 is validated in a separate step (step S17).

Next, the strip-like map information and searching map information are extracted from the set strip-like region and searching region corresponding to the scale magnitude. As a result, the limited region map information is generated (step S18). The generated limited region map information is stored in the auxiliary memory unit 17 (step S19), and this subroutine is brought to an end.

FIG. 3 shows a subroutine for setting the strip-like region and the searching region. This subroutine is called and executed in step S15 of the subroutine shown in FIG. 2 as described hereinabove.

At first, the free capacity of the auxiliary memory unit 17 is detected (step S21). In the case that the auxiliary memory unit 17 can accept a detachable memory such as an IC card, the map information can be generated correspondingly to the memory capacity even if a memory having the memory with different memory capacity is attached.

Next, in order to prompt an operator to select whether the operator sets the extraction width of the strip-like region, and the shape and range of the searching region, a display is displayed on the display unit 11 to prompt the operator to set these parameters (step S22). When the operator enters the selection for setting these parameters by the operator itself by means of key input, the display for selecting whether the initial value is used or not is displayed on the display unit 11 to prompt the operator to enter the key input (step S23). In the initial value, for example, the extraction width has been set to 2 km, the searching region shape has been set to circle, and the radius of the searching region range has been set to 4 km, and these initial values have been stored in the ROM 15 previously.

If the initial values are not selected (instead values are set by the operator), the region range setting subroutine shown in FIG. 4 that will be described hereinafter is called out and implemented. In this subroutine, the extraction width of the strip-like region and the shape and range of the searching region are set (step S24).

If it is desired to use the preset initial values as selected in the above-mentioned step S23, the initial values stored previously in the ROM 15 is read out and implemented. For example, the extraction width would be set to 2 km, the searching region shape would be set to a circle, and the radius of the searching region range would be set to 4 km (step S25).

Furthermore, in step S22 described hereinabove, if the operator selects no setting of the extracting width of the strip-like region and the shape and the range of the searching region, then the automatic setting routine shown in FIG. 5 that will be described hereinafter is called out and executed (step S26), and this subroutine is brought to an end.

Figure 4:
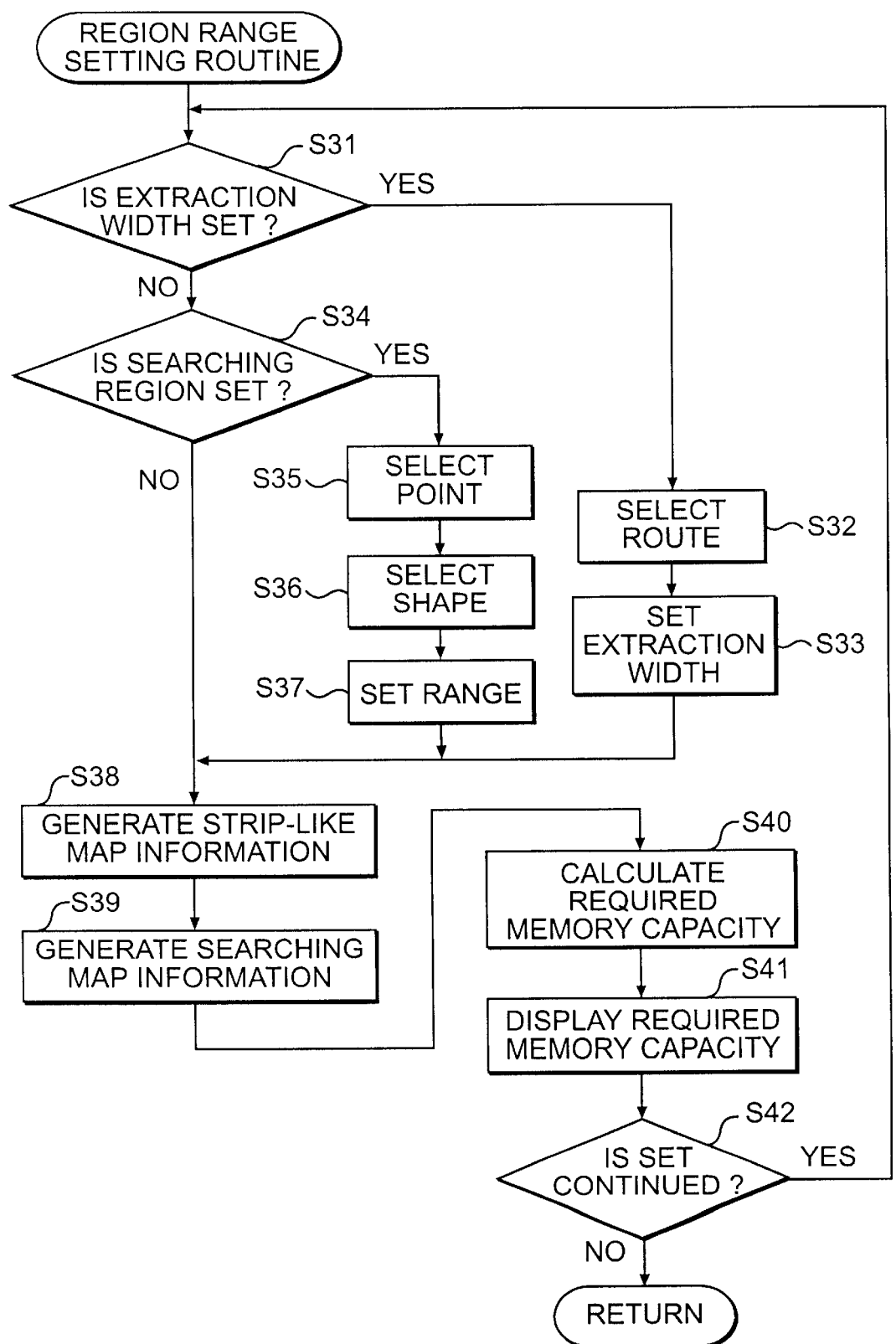
FIG. 4 is a flow chart for describing a subroutine for setting the extraction width of a strip-like region and the shape and range of a searching region according to an embodiment of the present invention.

FIG. 4 shows a subroutine for setting the extraction width of the strip-like region and the shape and range of the searching region. This subroutine is to be called out and executed in step S24 shown in FIG. 3 as described hereinabove.

At first, in order to prompt the operator to select whether the operator should set the extraction region of the strip-like region or not, a display is displayed on the display unit 11 to prompt the operator to exercise and select these options (step S31). If the operator selects and desires to set the extraction width, then the operator enters values from among 1 to n-1 that indicate routes $r_i$ (i=1, 2, . . . , n-1). These values can be inputted from ten keys of the input unit 14 to thereby select the route to which the extraction width is to be set. In this case, the subroutine may be structured so that a plurality of routes can be selected at a time in the selection of the route (step S32). Next, in order to set the extraction width of the selected route, the operator enters the extraction width value in kilometer (or other desired distance) units from the ten keys of the input unit 11 (step S33). In the setting of the extraction width, a method may be applied, in which the map is displayed on the display unit 11 together and the extraction width is increased/decreased by operating the cursor key or the mouse. The extraction width may be set to zero. In this case, the map information of the strip-like region is not extracted, and only the road information of the route that has been set in step S14 shown in FIG. 2 is extracted.

Since the strip-like map information or the searching map information is not necessarily needed when the road having less branch roads or highways is selected as the route $r_i$, the necessary memory capacity of the limited region map information to be generated is reduced by setting the extraction width to zero. In the following example, the respective extraction width of the routes $r_i$ (i=1, 2, . . . , n-1) are denoted by $\Delta w_i$ (i=1, 2, . . . , n-1), for example, the extraction width of the route $r_1$ is denoted by $\Delta w_1$, and the extraction width of the route $r_{n-1}$ is denoted by $\Delta w_{n-1}$.

Furthermore, in step S31, if the operator selects no setting of the extraction width, then, in order to prompt the operator to select whether the operator sets the shape and range of the searching region or not, a display is displayed on the display unit 11 to prompt the user to determine/select it (step S34). If the operator desires to and selects setting of the shape and range of the searching region, then the operator enters values of from among 1 to n that indicate the points $P_i$ (i=1, 2, . . . , n) from the ten keys of the input unit 14 to thereby select the point (step S35). Herein, a plurality of points may be selected at a time in the selection of the point. Next, the operator enters the shape number $C_i$ (i=0, 1, . . . , 3) from the ten keys of the input unit 14 to thereby select the shape of the searching region at the point $P_i$ (step S36). Herein, the shape number $C_i$ indicates that circle is selected for i=0, indicates that rectangle is selected for i=1, indicates that ellipse is selected for i=2, and indicates that square is selected for i=3. Since the subroutine is structured so that the shape of the searching region is selectable, the map information can be extracted so that it corresponds to the necessary searching region.

Next, the range of the searching region is set to correspond to the selected shape (step S37). In the setting of the range of the searching region, for example, the radius is set when the circle is selected, the horizontal length and the vertical length are set when the rectangle is selected, the major axis and the minor axis are set when the ellipse is selected, and the length of a side is set when the square is selected, respectively. In the setting, the operator enters the value in kilometer (or other distance) units by use of the ten keys of the input unit 11.

In the setting of the searching region, a method may be applied, in which a map is displayed on the display unit 11 together and a cursor or a mouse is operated to thereby increase/decrease the size of the searching region for setting. In the following example, the radius is denoted by $R_i$ when the circle is selected, the horizontal length is denoted by $M_i$ and the vertical length is denoted by $N_i$ when the rectangle is selected, the major axis is denoted by $S_i$ and the minor axis is denoted by $T_i$ when the ellipse is selected, one side length is denoted by $D_i$ when the square is selected, and these lengths are referred to as region size at the point $P_i$.

Next, a strip-like map information table as shown in FIG. 6 is generated and stored based on the set content in the RAM 16 (step S38). The routes $r_i$ (i=1, 2, . . . , n-1) are shown in the first column, the respective section distances $L_i$ (i=1, 2, . . . , n-1) of the routes ri are shown in the second column, the respective extraction widths $\Delta w_i$ (i=1, 2, . . . , n-1) of the routes $r_i$ are shown in the third column, and the required memory capacities $L_i \times \Delta w_i$ (i=1, 2, . . . , n-1) calculated by multiplying the section distances $L_i$ by the extraction widths $\Delta w_i$ of the respective routes $r_i$ are shown in the fourth column.

The section distance is obtained from the road information included in the map information. The size of the map information is determined correspondingly to the area of the region, the required memory capacity of the map information is obtained by calculating the area of the region, and the required memory capacity of the strip-like map information is obtained by calculating the total sum of the required memory capacities shown in the fourth column of FIG. 6.

The processing of step S38 shown in FIG. 4 is executed, and a searching map information table is generated in the RAM 16 as shown in FIG. 7 (step S39). In FIG. 7, the set points $P_i$(i=1, 2, . . . , n) are shown in the first column, the respective shape numbers $C_i$ (i=0, 1, . . . , 3) of the points $P_i$ are shown in the second column, the respective region sizes corresponding to the shapes at the point $P_i$ are shown in the third column, and the respective required memory capacities calculated from the region sizes at the point $P_i$ are shown in the fourth column.

In the searching map information table shown in FIG. 7, if the circle is selected, the radius $R_1$ is set as the region size, and the required memory capacity is calculated according to $\pi(R_1)^2$ at the point $P_1$. Furthermore, if the rectangle is selected at the point $P_2$, the horizontal length $M_2$ and the vertical length $N_2$ are set as the region size, and the required memory capacity is calculated to be $N_2M_2$. Furthermore, if the ellipse is selected at the point $P_i$, the major axis $S_i$ and the minor axis $T_i$ are selected as the region size, and the required memory capacity is calculated according to SiTi. Furthermore, if the square is selected at the point $P_n$, one side length $D_n$ is set as the region size, and the required memory capacity is calculated to be $(D_n)^2$. Herein, by calculating the total sum of the required memory capacities shown in the fourth column of FIG. 7, the required memory capacity of the searching map information is obtained.

Next, from the strip-like map information table and the searching map information table generated in the above-mentioned steps S38 and S39 respectively, the total sum of the required memory capacity for the current set content is calculated (step S40). The results are then displayed on the display unit 11 (step S41). For example, the total memory capacity of the memory of the auxiliary memory unit 17, the current required memory capacity, the current free capacity, and the ratio of the current free capacity to the total memory capacity can be displayed on the bottom of the screen of the display unit 11. By displaying such information on the display unit 11, the operator can effectively judge whether the size of the map information is appropriate or not during the course of setting/displaying ideal routes.

Next, the display on the display unit 11 prompts the operator to enter, via key input (step S42), and decide if the setting work should be continued. If the setting work is to be continued, then the sequence returns to step S31 and repeats the setting work. On the other hand, if the setting work is not to be continued, the subroutine is brought to an end.

As described hereinabove, since the required memory capacity and the free capacity throughout the process of the setting function for setting the extraction width or the like is displayed, and the setting content is changed throughout the process of the setting work, the operator can have greater control over the display parameters. In the event that the operator determines that the size of the map information is not appropriate, for example, in the case that the size of the map information is larger than that expected by the operator, the setting content can be adjusted immediately.

Figure 5:
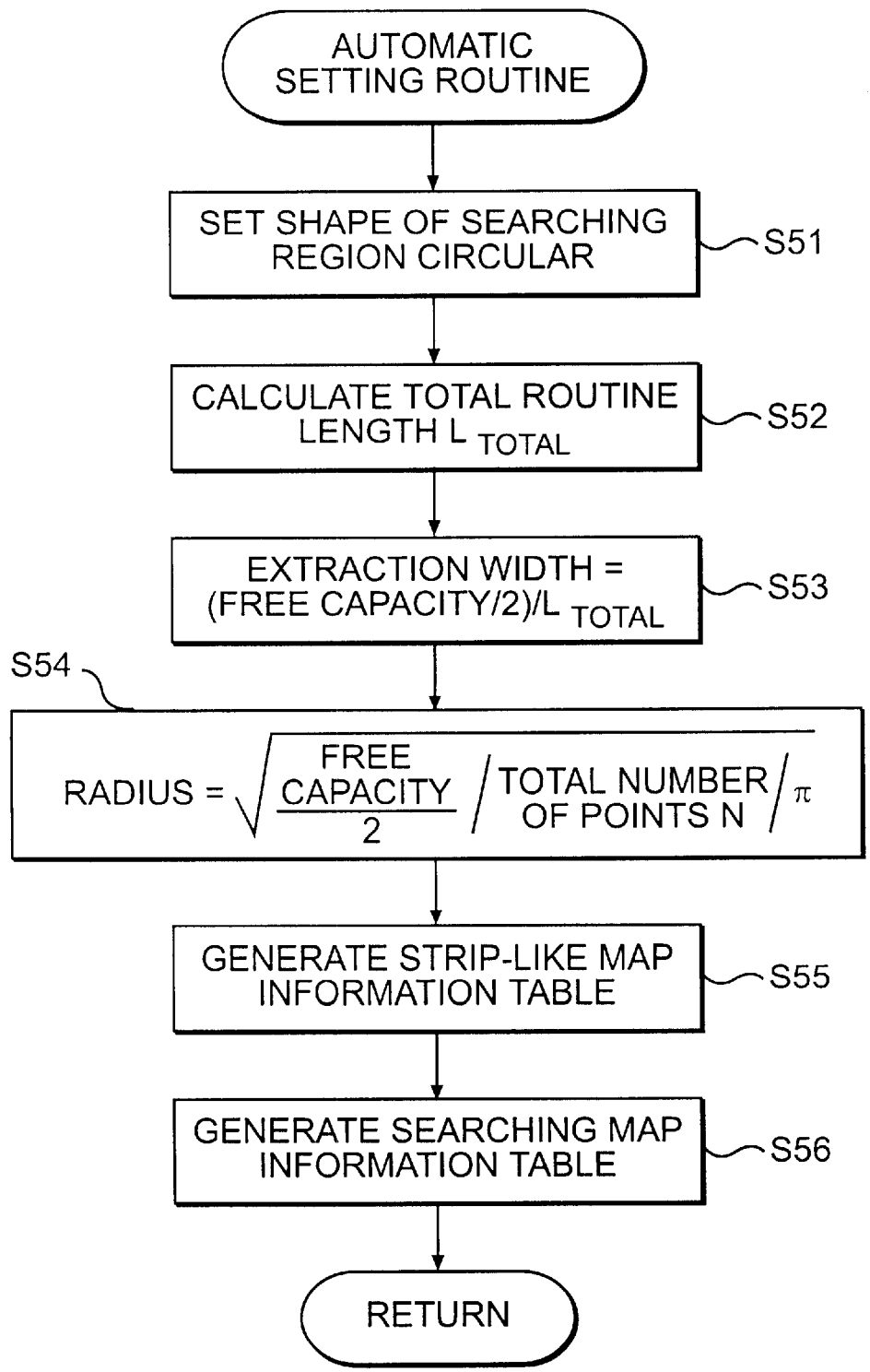
FIG. 5 is a flow chart for describing a subroutine for calculating the extraction width of a strip-like region and the shape and range of a searching region based on the free capacity, total route length, and total number of points according to an embodiment of the present invention.

FIG. 5 shows a subroutine for calculating the extraction width of the strip-like region, and the shape and range of the searching region, from the free memory capacity, the total route length, and the total number of points. Herein, this subroutine is called out and executed in step S26 of the subroutine shown in FIG. 3.

At first, the shape of the searching regions at all the points $P_i$ (i=1, 2, . . . , n) is set to be circular (step S51), and the total length $L_{TOTAL}$ is calculated (step S52). Herein, the total length $L_{TOTAL}$ of this route is equal to the total sum of the section distances $L_i$ (i=1, 2, . . . , n-1) shown in the second column of FIG. 6.

Next, the value obtained by dividing a half of the free capacity of the auxiliary memory unit 17 detected in step S21 shown in FIG. 3 by the total length $L_{TOTAL}$ of the route is regarded as the extraction width of the strip-like region (step S53). The square root of the value obtained by dividing a half of the free capacity by the total number of points n and further dividing by the circular constant π is regarded as the radius of the searching region (step S54).

Next, a strip-like map information table and a search map information table as shown in FIG. 6 and FIG. 7 are generated (steps S55 and S56) in the same manner as described in respect to steps S38 and S39 shown in FIG. 4, and this subroutine is brought to an end.

In the above-mentioned subroutine, the strip-like map information and the searching map information are generated in a manner in which a half of the free capacity of the auxiliary memory unit 17 is allocated to the strip-like map information, and the residual half is allocated to the searching map information. Furthermore, the strip-like map information is generated in a manner in which the extracting widths of the strip-like regions of all the routes are equal. In detail, the strip-like map information table shown in FIG. 7 is generated on the assumption that $\Delta w_1 = \ldots = \Delta w_i = \ldots = \Delta w_{n-1}$, and the strip-like map information is generated. Furthermore, the searching map information is generated on the assumption that all the radii of the circular searching regions have the same radius. In detail, the searching map information table shown in FIG. 7 is generated on the assumption that $R_1 = \ldots = R_i = \ldots = R_n$, and the searching map information is generated.

Furthermore, in the above-mentioned subroutine, the required memory capacity of the strip-like map information and the required memory capacity of the searching map information are set so as to be equal. However, both required memory capacities may be set so as to be different from each other. Furthermore, the extraction widths of the strip-like regions may not be equal to each other. Furthermore, the shape of the searching region may be another shape, and the radiuses of the searching regions may not be equal to each other.

Figure 8:
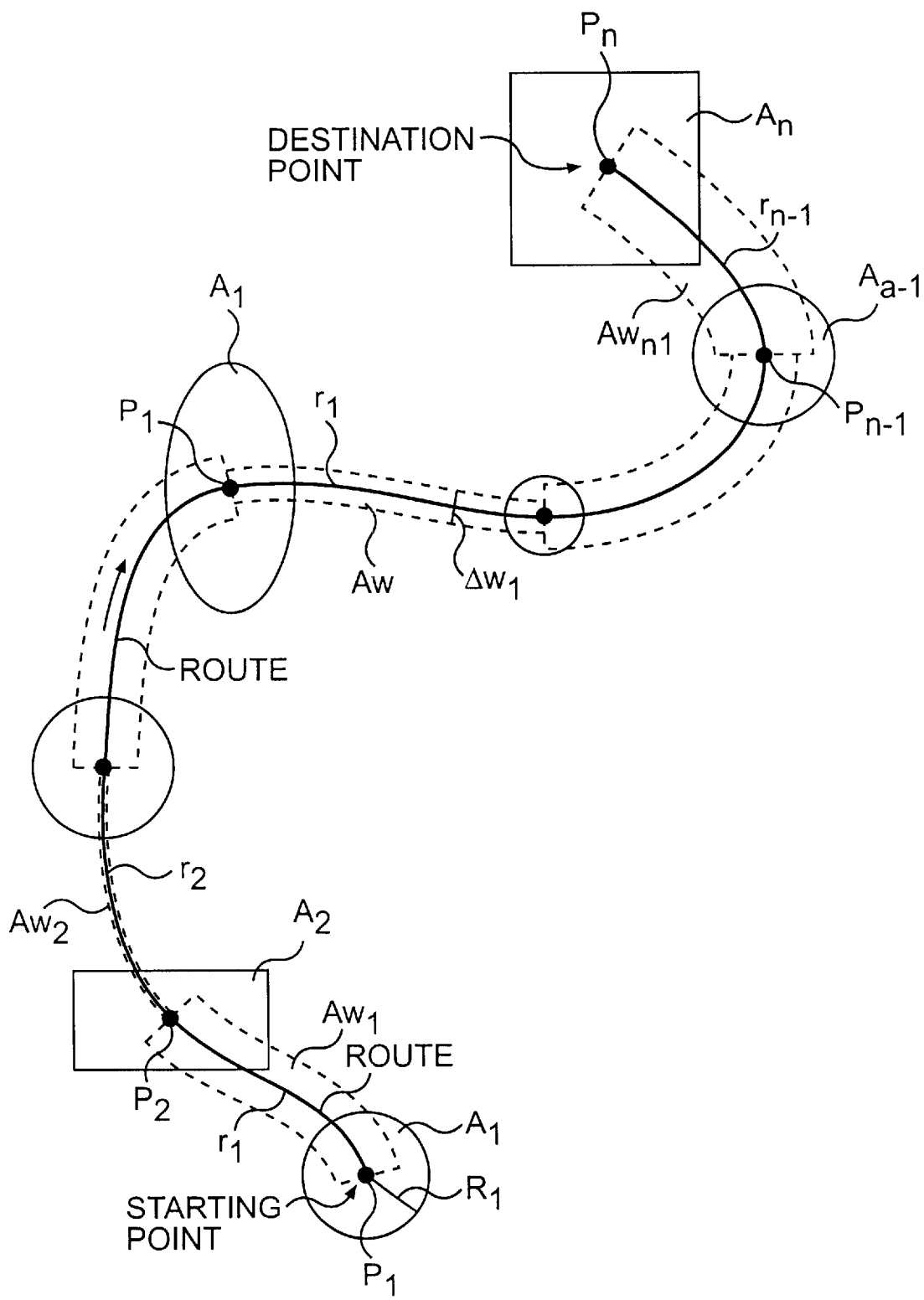
FIG. 8 is a diagram for showing exemplary, limited region map information generated by implementing the limited region map information extraction routine according to an embodiment of the present invention.

FIG. 8 is a diagram for illustrating an exemplary limited region map information generated by means of the limited region map information extraction routine.

In FIG. 8, the starting point $P_1$, the destination point $P_n$, the transition points $P_2$ to $P_{n-1}$ are shown with black points, and the routes $r_1$ to $r_{n-1}$ are shown with bold lines. Furthermore, strip-like regions $\Delta w_1, \ldots, \Delta w_{n-1}$ are shown as the region enclosed with a broken line, and the respective searching regions $A_1, \ldots, A_n$ are shown as the region enclosed with a solid line having the predetermined shape having the center at the points $P_i, \ldots, P_n$. Herein, in FIG. 8, the case corresponding to the searching map information table shown in FIG. 7 is shown, in which the shape of the searching region $A_1$ is circular, the shape of searching region $A_2$ is rectangular, the shape of the searching region $A_i$ is elliptical, and the shape of the searching region $A_n$ is square. Furthermore, the case in which the extraction width $\Delta w_2 = 0$ is set is shown for the route $r_2$, in this case the map information of the strip-like region is not extracted as described hereinabove, and the road information of only the route $r_2$ is extracted.

As described hereinabove, since the size of the strip-like region or searching region is changed to thereby generate the limited area map information, the required memory capacity of the limited region map information is reduced and the necessary map information is extracted without changing the transition point and route that have been set by the operator.

Figure 9:
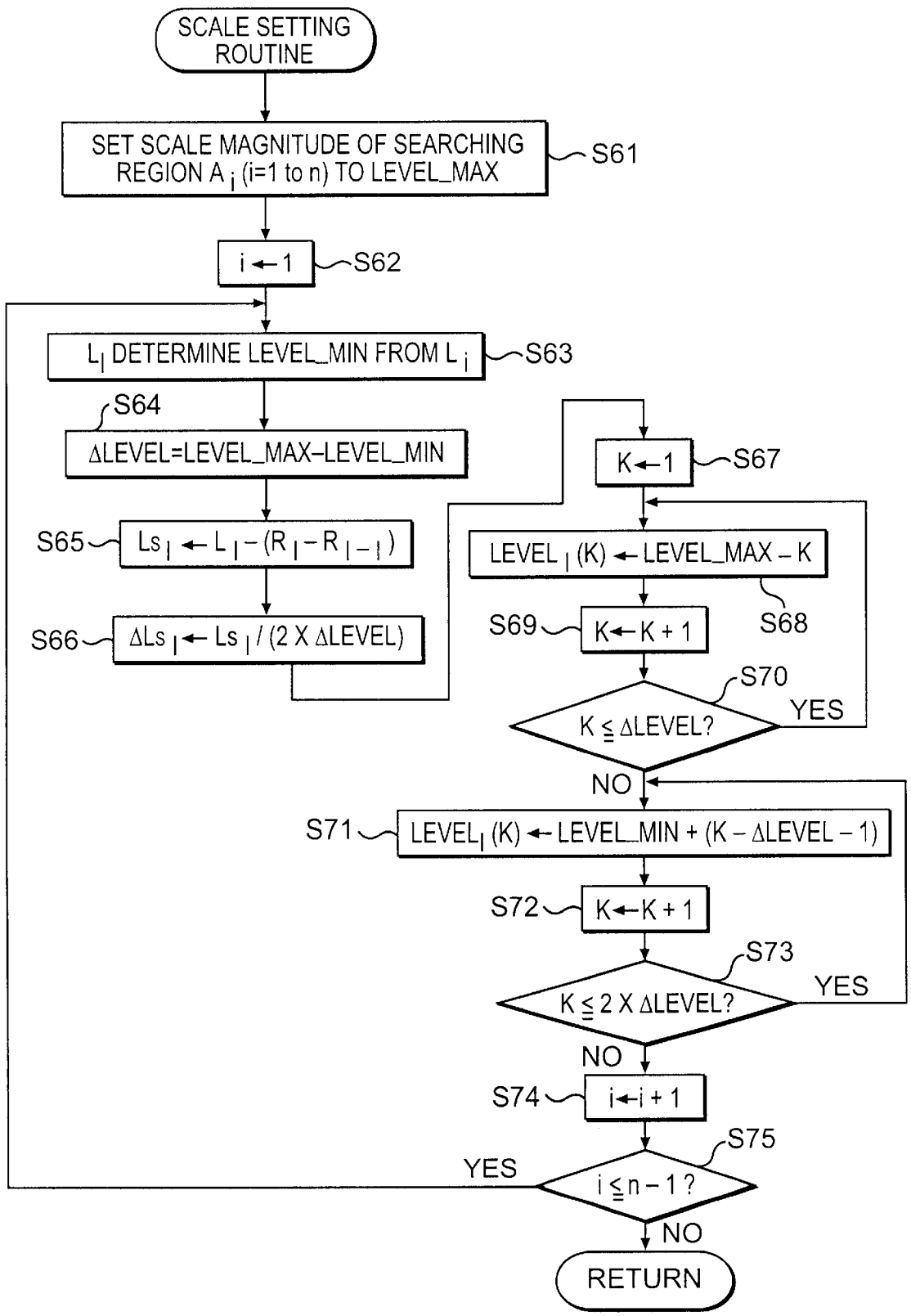
FIG. 9 is a flow chart for describing a subroutine for setting the scale level of a strip-like region and the scale level of a searching region.

FIG. 9 shows a subroutine for setting the scale magnitude that is executed in the above-mentioned step S16. Herein, the case in which the shape of the searching region is a circle having a desired radius is shown hereinafter.

At first, the scale magnitude of all the searching regions $A_i$ (i=1, 2, ..., n) from the first searching region $A_1$ to n-th region $A_n$ is set to the maximum value LEVEL_MAX for example, 14 (step 61). Herein, the scale magnitude means the degree of reduction scale as shown in the first column of the table of FIG. 10 (referred to scale level hereinafter), and the maximum value of the scale level in the exemplary case shown in FIG. 10 is 14. FIG. 10 is a table that shows the scale level of the map information stored in and supplied from a recording medium such as a CD-ROM. In the recording medium, the map information corresponding to scales from scale level 1 to scale level 14 is recorded. For example, in the case of a CD-ROM in which the map information of the entire country of Japan is recorded, all of the map information of Japan corresponding to respective scales from the scale level 1 to the scale level 14 is recorded.

In the second column, the third column, and the fourth column of the table shown in FIG. 10, the scale, the horizontal distance, and the vertical distance corresponding to the scale levels are shown respectively. The values indicated are based on metric value of kilometers, however, any unit of distance or measurement may be incorporated into the present invention and is anticipated as being incorporated into the spirit and scope of the present invention. The scale is displayed to indicate the graduation served for estimating the distance when the map information is displayed on the display unit. For example, as shown in FIG. 19 to FIG. 21, when the map information of the desired scale level is displayed on the display unit, the scale is displayed on the right bottom corner of the screen of the display unit in the form of a horizontal bold line graduation.

The horizontal distance shown in the third column in FIG. 10 indicates the maximum horizontal distance that can be displayed on the screen, and the vertical distance shown in the fourth column indicates the maximum vertical distance that can be displayed on the screen. The values shown in the third column and the fourth column in FIG. 10 indicate the vertical distances and horizontal distances that are displayed when the map information is displayed on a display unit having the horizontal size of 320 dots and the vertical size of 240 dots. For example, in the detailed example shown in FIG. 19(a), the displayed map information involves the case in which the scale level is 13, the scale is 50 m, the horizontal distance is 260 m, and the vertical distance is 200 m.

After step S61 of the subroutine shown in FIG. 9 is executed as described hereinabove, the value of the variable i for indicating the route number is initialized, for example, it is set to 1 (step S62). Next, the minimum value LEVEL_MIN of the scale level is determined based on the section distance $L_i$ value of the route $r_i$ (step S63). The LEVEL_MIN value is the maximum scale level value for displaying the entire route $r_i$ on the display unit 11. Next, ΔLEVEL namely the difference between the LEVEL_MIN and LEVEL_MAX is calculated (step S64). Next, the radius $R_i$ and the radius $R_{i+1}$ of the i-th searching region $A_i$ and (i+1)-th searching region $A_{i+1}$ that are positioned on both sides of the route $r_i$ are subtracted from the section distance $L_i$ to calculate the distance $Ls_i$ (step S65). The $Ls_i$ is divided by the value of doubled ΔLEVEL to calculate a small section distance $\Delta Ls_i$ (step S66). The sections formed by dividing by the small section distance $\Delta Ls_i$ are referred to as small section hereinafter.

Figure 11:
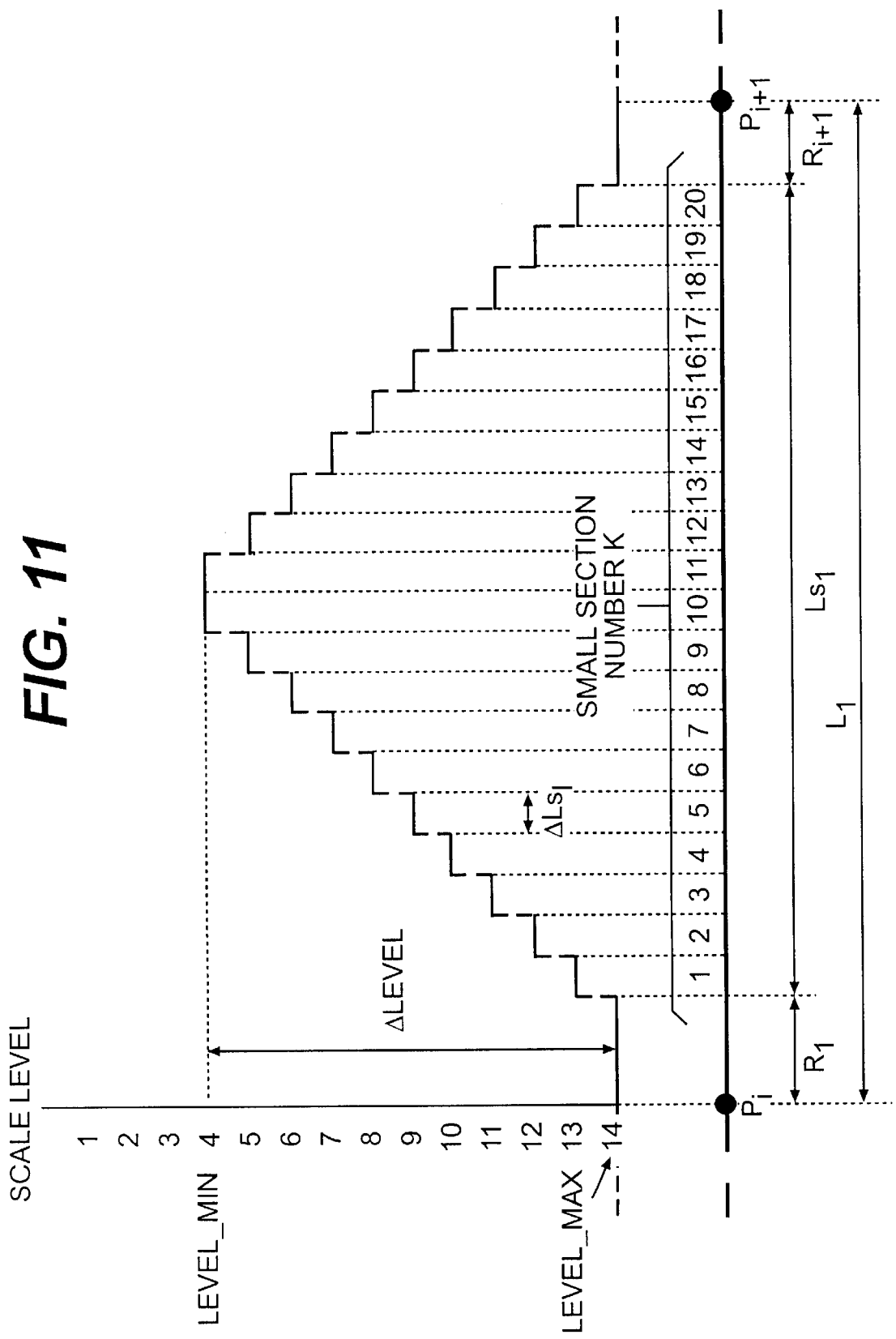
FIG. 11 is a diagram representing an embodiment of the present invention in which equally formed small sections have scale levels individually set for each small section.

An example in which the abscissa represents the route $r_i$ and the ordinate represents the scale level is shown in FIG. 11. In this example, the value of LEVEL_MAX is 14. Furthermore, the route $r_i$ shows the route between the point $P_i$ and the point $P_{i+1}$ as in the case of the example shown in FIG. 8. The value of LEVEL_MIN determined in the above-mentioned step S63 is 4 in the example shown in FIG. 11. The value of ΔLEVEL calculated in step S64 is 10 because the ΔLEVEL is the difference between LEVEL_MAX and LEVEL_MIN. Furthermore, the small section distance $\Delta Ls_i$ obtained in step S66 is the distance obtained by equally dividing the distance $Ls_i$ value by 20.

After step S66 of the subroutine shown in FIG. 9 described hereinabove is executed, k value for indicating the small section number is initialized, for example, it is set to 1 (step S67). Herein, in the example shown in FIG. 11, the value k of the small section number is a value in the range from 1 to 20. Next, the value of the scale level $LEVEL_j$ (k) at the k-th small section is calculated by subtracting k value from LEVEL_MAX (step S68), and next the k value is incremented by 1 (step S69). Next, whether k value is larger than ΔLEVEL or not is determined (step S70). If k value is determined to be equal to or smaller than ΔLEVEL, then the sequence returns to step S68, and the process is repeated. On the other hand, if k value is determined to be larger than ΔLEVEL, for example in the example shown in FIG. 11, if k value is larger than 10, then the scale level $LEVEL_j$ (k) value is calculated by adding the value that has been obtained by subtracting ΔLEVEL and 1 from k to LEVEL_MIN (step S71), and k value is incremented by 1 (step S72). Next, whether k value is not larger than 2×ΔLEVEL or not is determined (step S70).

If a k value is determined not to exceed 2×ΔLEVEL, then the sequence returns to step S71, and the process as described hereinabove is repeated. On the other hand, if k value is determined to be larger than 2×ΔLEVEL, for example in the example shown in FIG. 11 if k value is larger than 20, then i value is incremented by 1 to process the next route $r_{i+1}$ (step S74). Next, whether i value is not larger than n-1 or not is determined (step S75). If i value is determined to be not larger than n-1, then the sequence returns to step S63, and the process as described hereinabove is repeated. On the other hand, if i value is determined to be larger than n-1, that is, if it is determined that the process has proceeded to the final route $r_{n-1}$, then this subroutine is brought to an end.

Figure 21B:
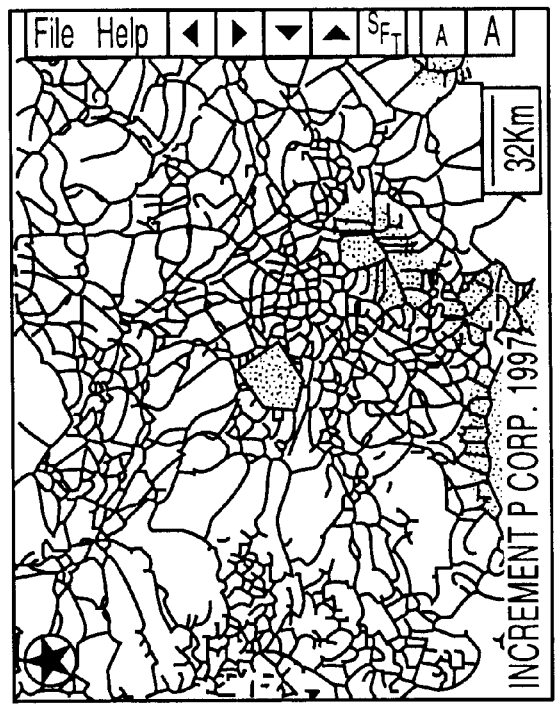
FIG. 21 is a diagram showing the detailed exemplary map information having specific scale level values according to an embodiment of the present invention.
Figure 21A:
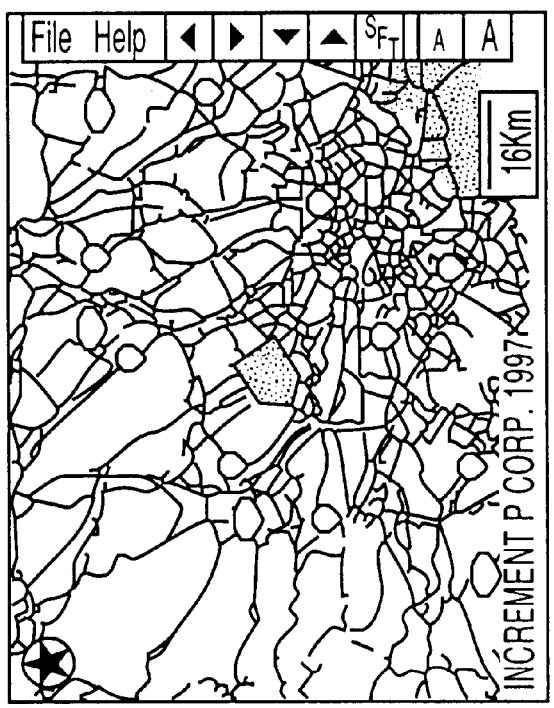

Examples of displayed map information having desired scale levels displayed on the display unit are shown in FIG. 19 to FIG. 21. FIG. 19(a) to FIG. 19(d) show the map information having scale levels 13 to 10, FIG. 20(a) to FIG. 20(d) show the map information having scale levels 9 to 6, and FIG. 21(a) and FIG. 21(b) show the map information having scale levels 5 and 4. Furthermore, a black pentagonal mark shown in each map information is the mark for indicating the present point, and a black circular mark is the mark for indicating the locus.

As shown in FIG. 19 to FIG. 21, more detailed map information is displayed as the numerical value of the scale level increases, and the smaller map information area is displayed as the numerical value of the scale level decreases. Furthermore, for example, when a vehicle moves from Tokorozawa to Maebashi on Kanetsu Highway, in the case that the vehicle will not move to another non-highway road from an interchange during the route on Kanetsu Highway, the detailed map information of the area during the travel route on Kanetsu Highway is not necessary. Therefore, in such cases, it is not necessary to extract the map information having a large scale level value on the vicinity of Kanetsu Highway, and only the map information having a small scale level value may be extracted to thereby generate a limited region map information with greater localized detail.

As described hereinabove, depending on whether the detailed map information is necessary or not, for example, the map information is generated by changing the scale level corresponding to the moving route type to thereby reduce the size of the required memory capacity.

By executing the subroutine shown in FIG. 9 described hereinabove, a table as shown in FIG. 12 is generated for the small section of the route $r_i$. Herein, the value shown in the table of FIG. 12 is the value corresponding to the example shown in FIG. 11. In the range of the small section number k from 1 to 10, the scale level value decreases successively from 14, and the scale level value falls to the LEVEL_MIN namely 4 at the small section number k=10. The scale level value increases successively from the small section number k=11, and the scale level value rises to LEVEL_MAX namely 14 at the small section number k=20.

Figure 13:
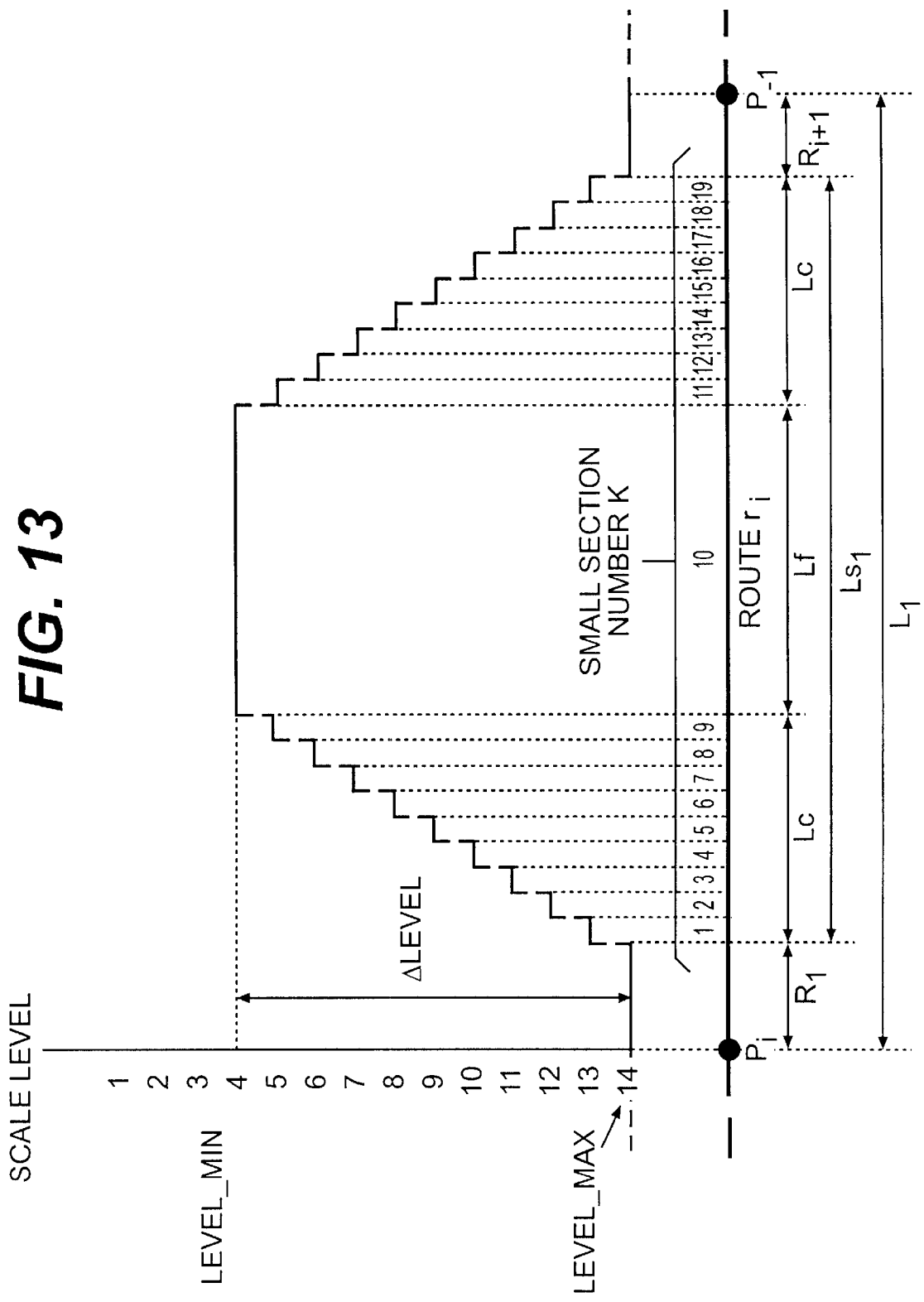
FIG. 13 is a diagram representing an embodiment of the present invention in which equally formed small sections have scale levels individually set for each small section.

Herein, in the above-mentioned example shown in FIG. 9 to FIG. 12, a case in which the strip-like region is equally divided into small sections and the scale level value of each small section is determined individually is described. However, as shown in FIG. 13, the scale level value may be set in a different manner, in which the scale level value is changed in a certain section having a distance Lc and the scale level value is changed with every equal interval in the Lc. The scale level value is not changed in the residual section Lf and the scale level value is kept at LEVEL_MIN in this entire Lf.

Figure 14:
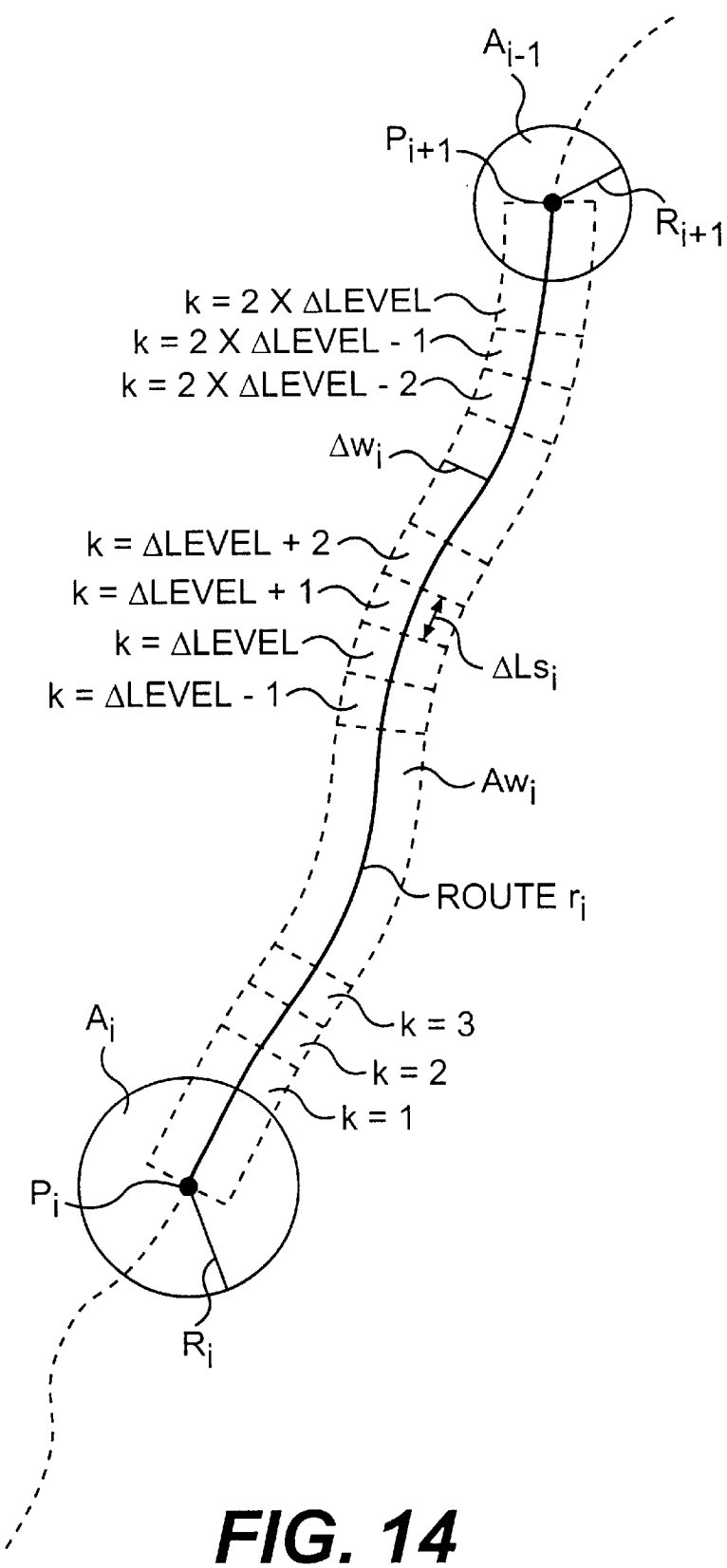
FIG. 14 is a diagram for illustrating an exemplary strip-like region of map information generated by setting the scale level of small sections by implementing the subroutine shown in FIG. 9.

Furthermore, in the above-mentioned example, the case in which the scale level value is changed, one by one with every equal distance interval, is described. However, the scale level value may be changed by two at a time, or the scale level value may be changed over unequal distance intervals. One example of a strip-like region map information that is generated with setting of the scale level of the small section by executing the subroutine shown in FIG. 9 is shown in FIG. 14. FIG. 14 is the map information of the strip-like region Awi along the route $r_i$ between the point $P_i$ and $P_{i+1}$, and as in the case of the example shown in FIG. 11, the case is shown, in which the divided small sections having the small section distance $\Delta Ls_i$ of equal intervals are formed. The scale level of each small section is determined individually. These small sections are given small section numbers k from 1 for the small section located nearest to the point $P_i$ to 2×ΔLEVEL.

In the case of the example shown in FIG. 11, because ΔLEVEL=10, then the small section of k=ΔLEVEL is 10-th small section, and the small section of k=2×ΔLEVEL is 20-th small section. As described hereinabove, the respective scale level of small sections can be set by executing the scale setting subroutine shown in FIG. 9, and in the example shown in FIG. 11, k=1 namely the scale level of the first small section is set to 13, and k=10 namely the scale level of the 10-th small section is set to 4. The scale level of the respective scale level of small sections is set as described hereinabove, the map information corresponding to the set scale level is extracted for each small section, and the strip-like region map information is generated.

Figure 15:
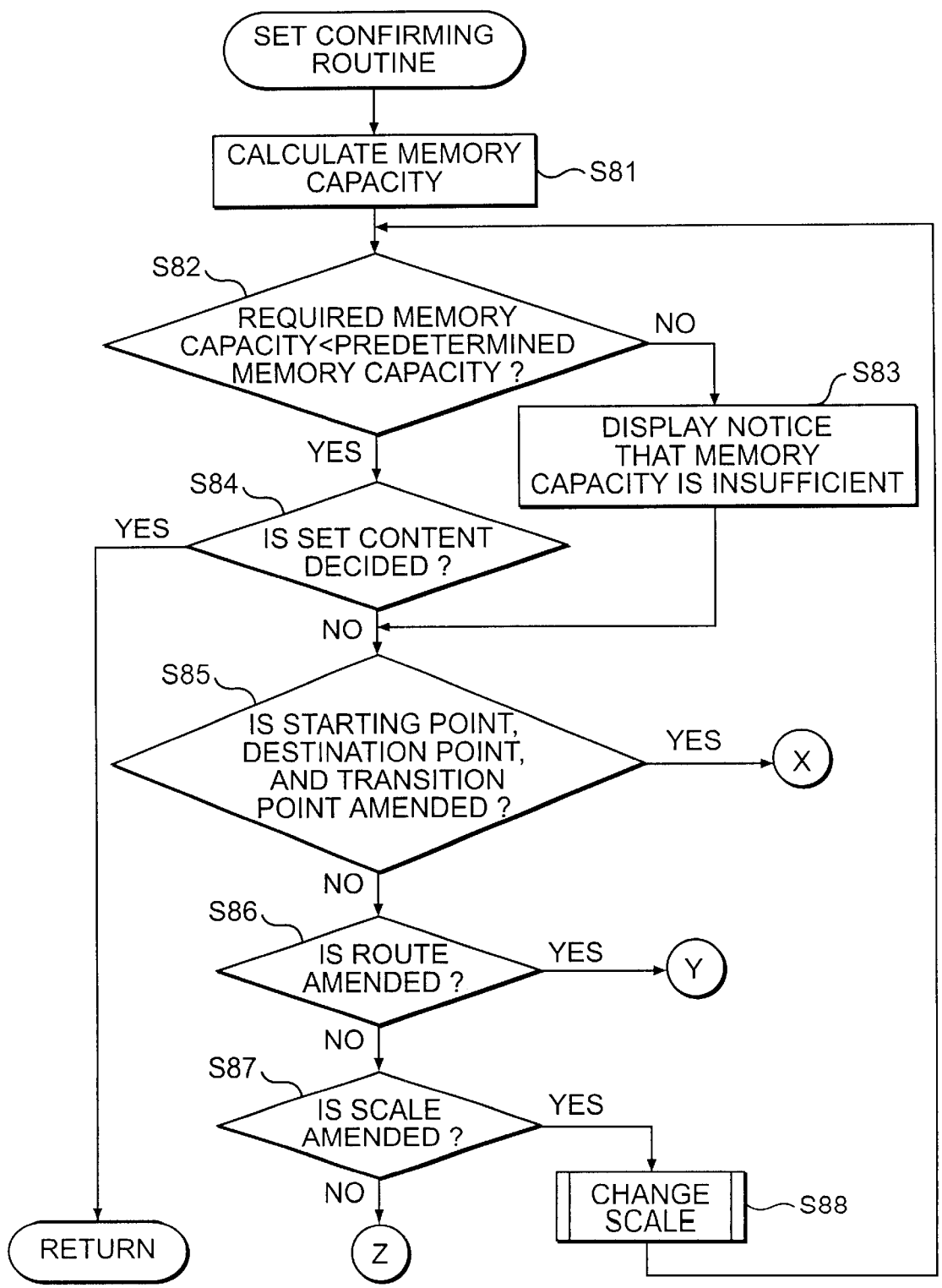
FIG. 15 is a flow chart for describing a subroutine for confirming the setting item of a strip-like region and a searching region and the setting item of the scale level.

A subroutine for confirming the setting item of the strip-like region and searching region and the setting item of the scale level is shown in FIG. 15.

The memory capacity required to generate the map information is calculated from the strip-like region and the searching region that have been set first (step S81), and whether the required memory capacity is determined to be not larger than the predetermined memory capacity. For example, the free capacity obtained in the above-mentioned step S21 or the size of the map information desired by the operator, is determined (step S82). If the required memory capacity is determined to be larger than the predetermined memory capacity, then notification that the required memory capacity is excessive is displayed (step S83), and the sequence proceeds to step S85 that will be described hereinafter.

On the other hand, if the required memory capacity is determined to be smaller than the predetermined memory capacity, a notice for prompting the operator to select whether the set content should be amended or not is displayed on the display unit 11 (step S84). If no amendment is selected, then this subroutine is brought to an end immediately.

On the other hand, if the required memory capacity is determined to be larger than the predetermined memory capacity in step S82, or if the amendment of the set content is selected in step S84, then a notice for prompting the operator to select whether the operator amends the starting point, the destination point, or the transition point or not is displayed on the display unit 11 (step S85). If the amendment of the starting point, the destination point, or the transition point is selected, then the sequence proceeds to step S13 shown in FIG. 2.

On the other hand, if no amendment of the starting point, the destination point, or the transition point is selected, then notification prompting the operator to select whether the operator amends the route or not is displayed on the display unit 11 (step S86). If the amendment of the route is selected, then the sequence proceeds to step S14 shown in FIG. 2.

Furthermore, if no amendment of the route is selected, then notification prompting the operator to select whether the operator amends the scale or not is displayed on the display unit 11 (step S87). If the amendment is selected, then the sequence proceeds to the subroutine shown in FIG. 16 that will be described hereinafter (step S88). On the other hand, if no amendment of the scale is selected, then the sequence proceeds to step S24 shown in FIG. 3 in order to amend the extraction width of the strip-like map region or the shape or the range of the searching map region.

Herein, for example, in the case that the limited region map information is obtained through the communication line such as telephone line or the like as described hereinafter, the predetermined memory capacity in the above-mentioned step S82 may have the size that is determined based on the communication rate of the communication line and the communication time required. In the case that the limited region map information is generated so that the size of the limited region map information is not larger than the predetermined memory capacity that has been determined as described hereinabove, the limited region map information can be obtained through the communication line within the desired/required communication time.

Figure 16:
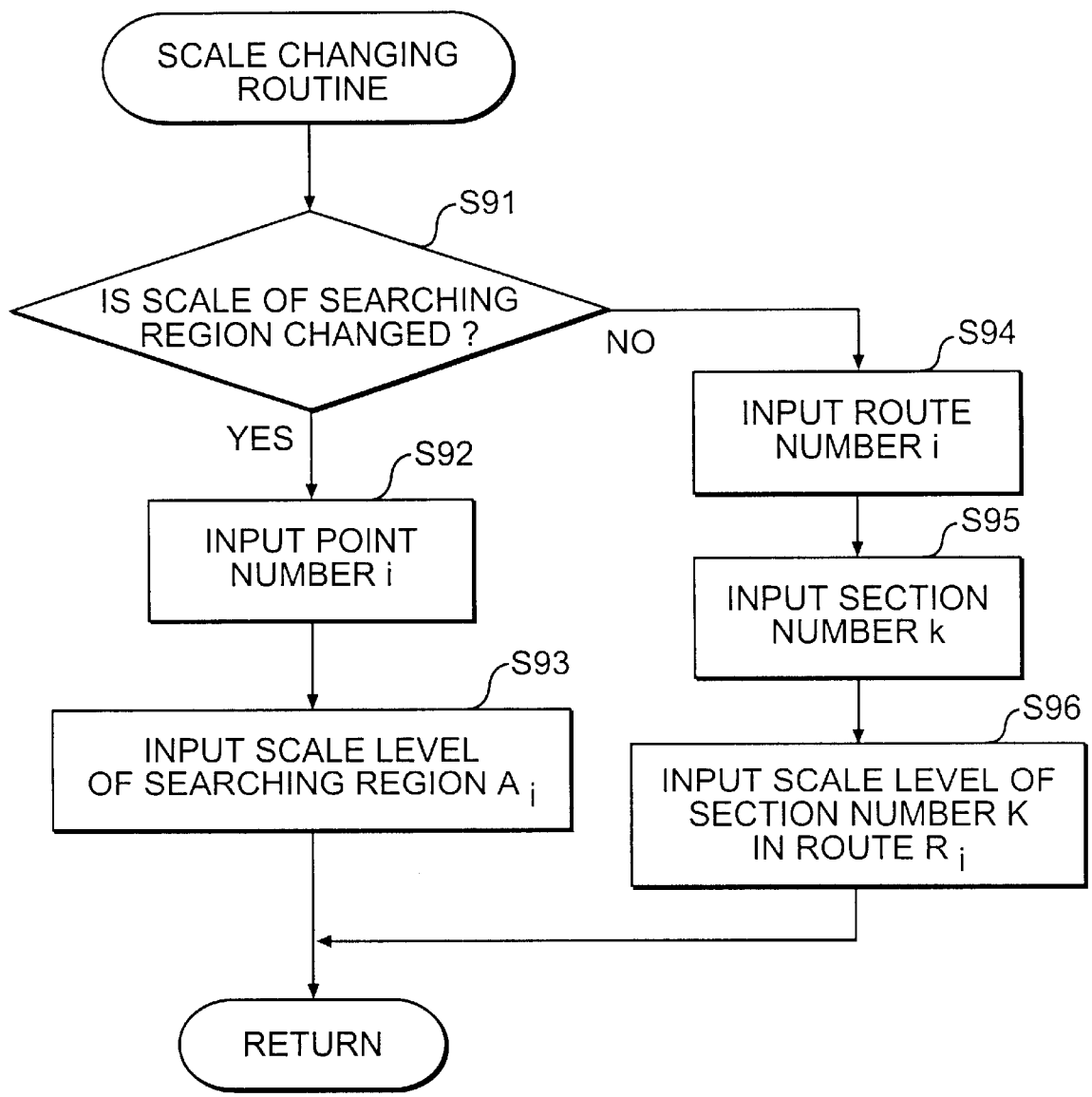
FIG. 16 is a flow chart for describing a subroutine for changing the scale level implemented in step S88.

A subroutine for changing the scale level to be executed in the above-mentioned step S88 is shown in FIG. 16.

At first, a notice for prompting the operator to select whether the scale of the searching region is amended or the scale of the strip-like region is amended is displayed on the display unit 11 (step S91). If the amendment of the scale of the searching region is selected, then a notice for prompting the operator to enter the point number i of the point where the scale is to be amended is displayed on the display unit 11, and the operator sets the point number i (step S92). Next, a notice for prompting the operator to amend the scale level of the searching region $A_i$ that includes the point $P_i$ is displayed on the display unit 11 to thereby amend the scale level of the searching region $A_i$ (step S93), and this subroutine is brought to an end.

On the other hand, in step S91, if the amendment of the scale of the strip-like region is selected, then a notice for prompting the operator to enter the route number i of the route where the scale is to be amended is displayed on the display unit 11, and the operator enters and sets the route number i (step S94). Next, a notice for prompting the operator to enter the small section number k in the route $r_i$ is displayed on the display unit 11, and the operator enters and sets the small section number k (step S95). Next, a notice for prompting the operator to amend the scale level of k-th small section in the route $r_i$ is displayed on the display unit 11, and the operation amends the scale level of the k-th small section (step S96), and then this subroutine is brought to an end.

Figure 17A:
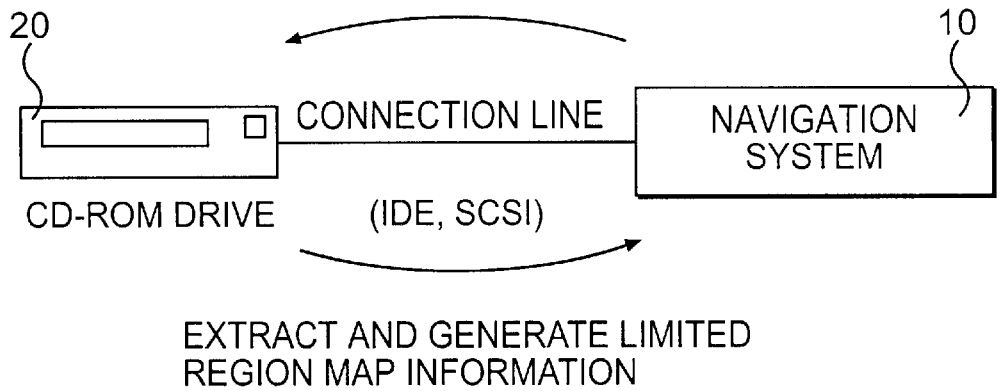
FIG. 17 is a schematic diagram for illustrating the first and second examples of the present invention.

FIG. 17 shows the first and second examples of the present invention respectively. FIG. 17(a) is a schematic diagram for illustrating a moving body map information display system according to the first example of the present invention. In this case, the map information supply apparatus 20 comprises an external auxiliary memory unit such as a CD-ROM drive, DVD drive or the like. On the other hand, the map information display apparatus 10 comprises, for example, a vehicle navigation system having a predetermined interface circuit served for connection to the external auiliary memory unit such as an IDE standard or SCSI interface circuit and a connector served for connection to the external auxiliary memory unit (not shown).

The operator sets a recording medium for the external auxiliary memory unit in which the map information of a predetermined region has been stored, for example, a CD-ROM (not shown) in the case of a CD-ROM drive, and the operator operates the key board provided for the vehicle navigation system according to the procedure described with respect to FIG. 2 to FIG. 6 to thereby generate a limited region map information. The limited region map information is then stored in a memory means provided in the vehicle navigation system, for example, a non-volatile RAM. When an operator moves, for example, when the operator tours by a motorcycle on which only the vehicle navigation system is mounted, in which vehicle navigation system the limited region map information has been stored.

Figure 17B:
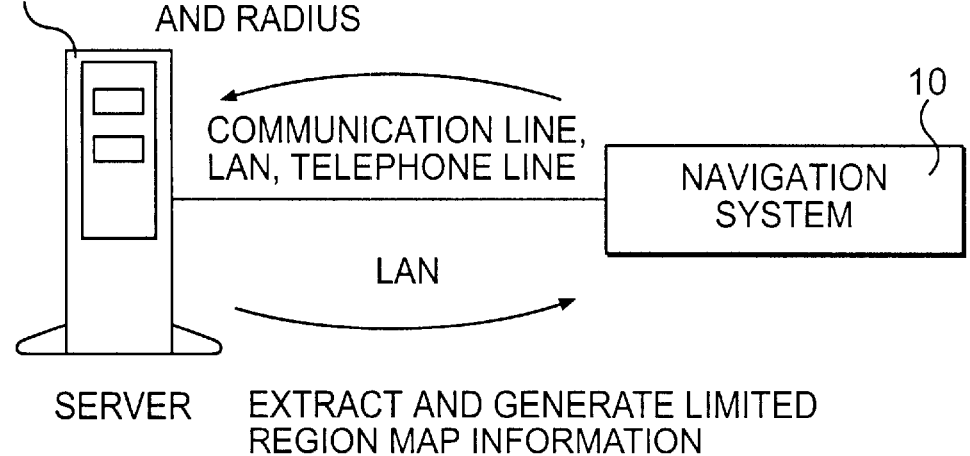
Figure 19A:
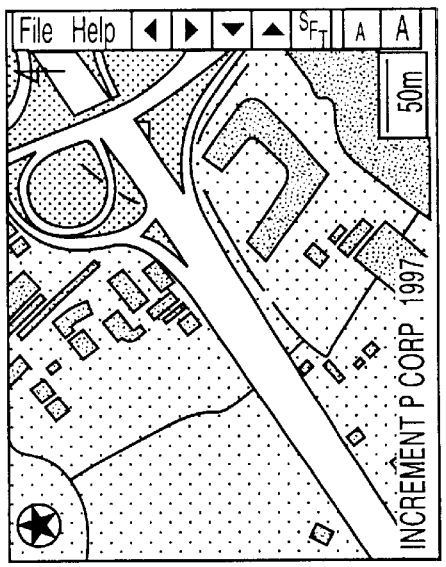
FIG. 19 is a diagram showing the detailed exemplary map information having specific scale level values according to an embodiment of the present invention.
Figure 19B:
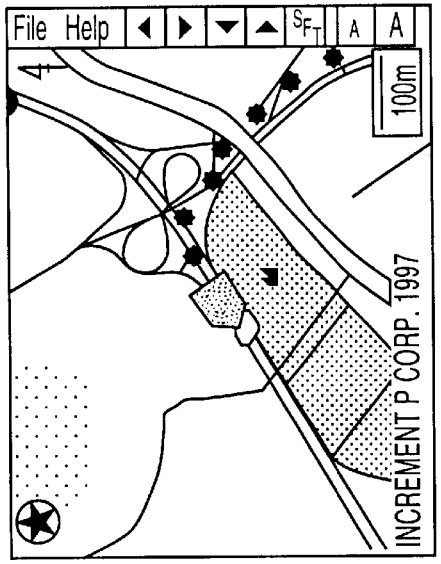
Figure 19C:
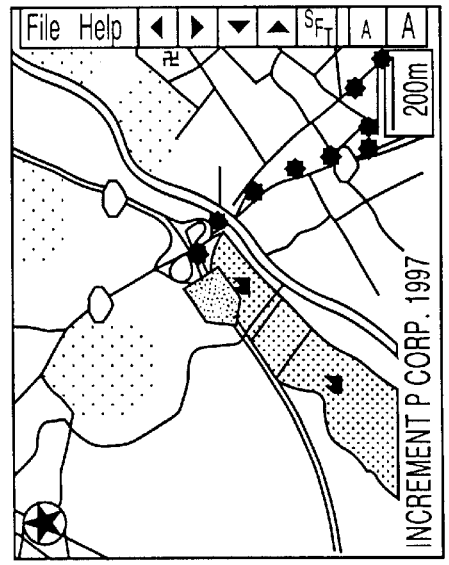
Figure 19D:
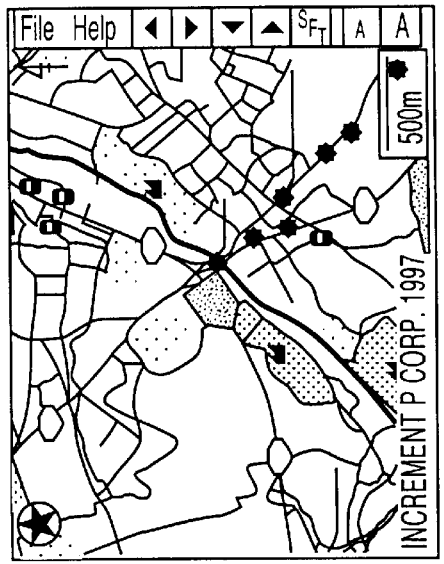
Figure 20A:
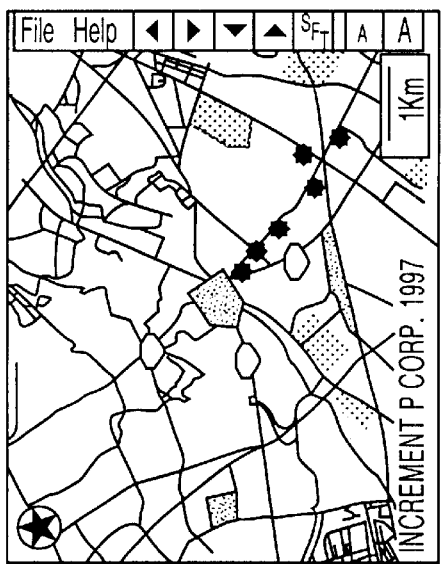
FIG. 20 is a diagram showing the detailed exemplary map information having specific scale level values according to an embodiment of the present invention.
Figure 20B:
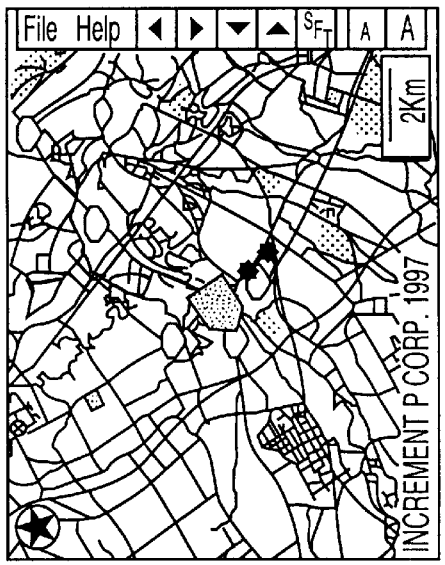
Figure 20C:
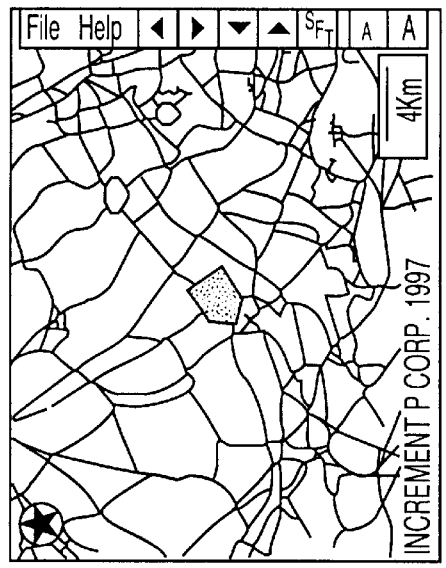
Figure 20D:
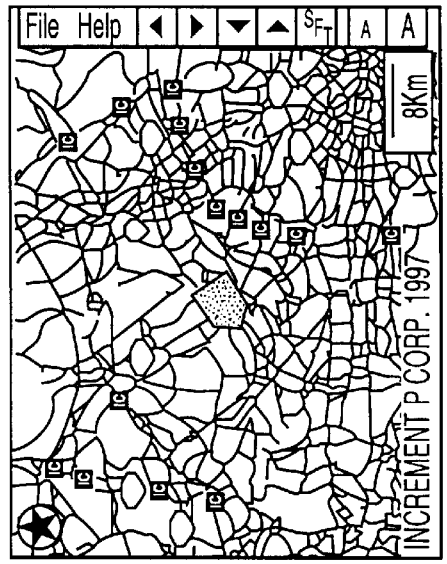

FIG. 17(b) is a schematic diagram for illustrating a moving body map information display system according to the second example of the present invention, in which a server that stores the map information. For example, a server who is a supplier of the map information on the Internet, is used as the map information supply unit. The vehicle navigation system that is served as the map information display apparatus is provided with a communication line such as a local area network (referred to as LAN hereinafter) and a communication interface circuit (not shown) for communication through a telephone line. After the limited region map information is generated according to the procedure described with respect to FIG. 2 to FIG. 16, the limited area map information is downloaded from the server to the vehicle navigation system, and the limited region map information is stored in a memory means provided in the vehicle navigation system such as a non-volatile RAM. When an operator moves, a limitation is that the operator may move only within the limited region map information that has been stored within the vehicle navigation system. In the second example, all the coordinate information generation means, limited region map information generation means, display means, and memory means are contained in the vehicle navigation system that is served as the map information display apparatus.

FIG. 18 shows the third and fourth example of the present invention. FIG. 18(a) is a schematic diagram for illustrating a moving body map information display system according to the third example of the present invention, and this is a moving body map information display system for generating a limited region map information by use of an apparatus other than the vehicle navigation system.

An apparatus such as a computer having a built-in CD-ROM drive is used for generating a limited region map information. The operator sets the CD-ROM (not shown) in which the map information of the predetermined region is stored on the CD-ROM driver to display the map information on the display connected to the computer, and operates the key board or a mouse of the computer to generate the limited region map information according to the procedure as described with respect to FIG. 2 to FIG. 16. Thereafter, the computer is connected to a vehicle navigation system served as the map information display apparatus having the communication function through a predetermined connection means namely a connection line such as LAN, telephone line, or serial communication connection line, and the generated limited region map information is stored in the memory unit such as a RAM or the like in the vehicle navigation system. When the operator moves, the operator can move only with the vehicle navigation system in which the limited region map information has been stored as described hereinabove.

Otherwise, the generated limited region map information may be stored in a server, for example, a server of the Internet. In the case that the structure is employed, it is possible for the operator that the vehicle navigation system is connected to a server through a communication line at place where the operator moves, and the limited region map information is stored in the vehicle navigation system.

FIG. 18(b) is a schematic diagram for illustrating a moving body map information display system according to the fourth example of the present invention, and shows a moving body map information display system for generating the limited region map information by use of an apparatus other than the vehicle navigation system as in the case shown in FIG. 18(a).

The map information for generating the limited regional map information is contained in a server such as a server of the Internet server. The map information is displayed on the display of the computer connected to the server through a communication line such as a LAN or telephone line, and the limited region map information is generated on the computer according to the procedure as described with respect to FIG. 2 to FIG. 6 by operating a key board or a mouse of the computer. Thereafter, the computer is connected to the vehicle navigation system served as the map information display apparatus and having a communication function through a communication means as described hereinabove such as LAN, telephone line, or serial communication connection line. The generated limited region map information is then stored in a memory unit such as an RAM or the like in the vehicle navigation system.

However, the above-mentioned structure allows the operator to move only within the generated limited region map information displayed on the vehicle navigation system. However, in this case, the generated limited area map information may be contained in a server, for example, a server of the Internet as in the case shown in FIG. 18(c). The same components shown in FIG. 18(c) as those shown in FIG. 18(b) are given the same characters and names.

In the case of the structure as described hereinabove, the vehicle navigation system is connected to a server through a communication line such as a telephone line or the like by use of the communication function of the vehicle navigation system, and the operator can thereby obtain the generated limited region map information at the place where the operator is moving or the operator is staying.

Furthermore, in the third and fourth examples, in the case that the limited region map information is contained in a server, it is not necessary to store the entire limited region map information in the vehicle navigation system. The partial limited region map information of only the region necessary for traveling may be obtained from the server and it is displayed. In the case of the structure as described hereinabove, the memory capacity of the memory unit such as an RAM or the like of the vehicle navigation system can be reduced even more.

Herein, in the examples described hereinabove, the cases in which a vehicle navigation system is used as the moving body map information display apparatus are described, however, the moving body map information display apparatus is by no means limited to an apparatus for a vehicle, and may be used for the case in which a person or other vehicle or device moves with the apparatus.

Furthermore, in the above-mentioned examples, the cases in which the map information is extracted with a constant extraction width $\Delta w_i$ between two point sections are described, however, the map information may be extracted with changing extraction width $\Delta w_i$ corresponding to the position on a route to generate the strip-like map information.

Furthermore, in the above-mentioned examples, the cases in which the shape of a searching area is selected from among predetermined shapes are described, however, the operator may set an arbitrary shape as desired.

Furthermore, in the above-mentioned examples, the cases in which the limited region map information is generated by use of a recording medium that stores the map information correspondingly to the scale level are described. However, in the case in which the map information is stored as the vector data, a different structure may be employed, in which the arithmetic operation is performed based on an arbitrary scale specified by an operator and the limited region map information is thereby generated.

In the present specification, the term "strip-like region" means the longitudinal region along the route, and includes various region shapes that are, for example, semicirclular or semi-elliptical on both ends in addition to rectangular regions or shapes.

As described hereinabove, according to the moving body map information display system according to the present invention, since the scale level is set and the strip-like region map information is extracted by changing the scale level of the strip-like region map information along the route of a moving body, the necessary map information is extracted correctly and easily and displayed without changing the transition point and/or the route that are set by an operator.

The present invention is not limited to the above described embodiments, and various design modifications are possible without departing from the spirit and scope of the invention as disclosed in the claims. Such variations are not to be regarded as a departure from the spirit and scope of the invention, and all such modifications as would be obvious to one skilled in the art are intended to be included within the scope of the following claims.

What is claimed is:

1. A moving body map information display system comprising:

means for generating a set of route point coordinate information for indicating points on a transition route and a scheduled route of a moving body;

means for generating and extracting a plurality of limited region map information, said limited region map information based on said route point coordinate information that is stored in a memory medium and includes a plurality of road information to thereby generate the limited region map information;

means for storing said limited region map information; and means for displaying said stored limited region map information, wherein said means for generating said limited region map information further includes means for generating a moving body route based on said route point coordinate information and said road information, means for setting map scale, wherein scale magnitudes of a plurality of strip-like regions of map information located along said moving body route varies along said moving body route, and means for extracting said strip-like regions based on said scale magnitudes.

2. The moving body map information display system according to claim 1, wherein said means for setting map scale sets the scale magnitudes corresponding to route lengths of said strip-like regions.

3. The moving body map information display system according to claim 1, wherein said scale magnitudes are set so as to change continuously with each respective strip-like region.

4. The moving body map information display system according to claim 1, said means for generating said limited region map information generation has a scale control means for controlling the scale magnitudes set by said means for setting map scale.

5. The moving body map information display apparatus according to claim 4, wherein said scale control means controls the scale magnitudes when a required memory capacity of said limited region map information exceeds a predetermined memory capacity.

6. The moving body map information display apparatus according to claim 5, wherein said predetermined memory capacity is equal to or smaller than a memory capacity of said memory means.

7. The moving body map information display system according to claim 1, said means for extracting adds a plurality of searching region map information for a searching region positioned around a point on said moving body route specified by said limited region map information.

8. The moving body map information display system according to claim 7, wherein said plurality of searching region map information includes an individual search point;

a searching region shape;

a searching region range; and a searching region required memory capacity.

9. The moving body map information display system according to claim 1, wherein said means for extracting said strip like regions further includes a plurality of map information for said strip-like regions, said map information for said strip-like regions including at least one individual route;

a section distance corresponding to each individual route;

an extraction width; and a required memory capacity for each individual route.

10. The moving body map information display system according to claim 1, wherein said moving body has means for detecting a present position coordinate information of said moving body, and said means for extracting adds said present position coordinate information to said limited region map information.

11. A moving body map information display apparatus for a vehicle comprising:

a display unit;

an input unit;

a global positioning system for providing a plurality of coordinate data for said vehicle;

a plurality of memory units for accomodating a required system memory;

a central processing unit for generating a moving body route and extracting a plurality of limited region map information based on route coordinate points of said vehicle, wherein said limited region map information includes strip-like regions of map information based upon said moving body route, said strip-like regions having scale magnitudes set in order to limit said required system memory below a memory capacity of said memory units;

an interface circuit;

an input/output bus; and a map information supply apparatus for providing a plurality of map information for the moving body route for said vehicle, said map information supply apparatus connected through said interface circuit to said input/output bus.

12. The moving body map information display apparatus according to claim 11, wherein said map information supply apparatus includes a CD-ROM or DVD-Drive.

13. The moving body map information display apparatus according to claim 11, wherein said map information supply apparatus includes a LAN or server providing connections to a plurality of stored map information.

14. The moving body map information display apparatus according to claim 11, wherein said central processing unit extracts and generates limited region map information including starting points, destination points, transition points, and extraction widths and radii of said strip-like regions.

* * * * *